(12) United States Patent
Tsushima et al.

(10) Patent No.: US 8,917,160 B2
(45) Date of Patent: Dec. 23, 2014

(54) RFID MODULE

(75) Inventors: Takaaki Tsushima, Chiba (JP);
Toshiyuki Takahashi, Tokyo (JP);
Toshihiko Takeda, Saitama (JP);
Zenkichi Mihara, Chiba (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 268 days.

(21) Appl. No.: 13/243,586

(22) Filed: Sep. 23, 2011

(65) Prior Publication Data

US 2012/0242456 A1  Sep. 27, 2012

Related U.S. Application Data

(60) Provisional application No. 61/454,780, filed on Mar. 21, 2011.

(51) Int. Cl.
*H04Q 5/22* (2006.01)
*G06K 19/07* (2006.01)
*H04B 5/00* (2006.01)

(52) U.S. Cl.
CPC ........ *G06K 19/0723* (2013.01); *G06K 19/0726* (2013.01); *H04B 5/0031* (2013.01); *H04B 5/0081* (2013.01)
USPC ............. 340/10.1; 340/10.51; 340/693.3; 235/380; 235/439; 235/451; 307/110; 455/41.1; 455/41.2; 455/334

(58) Field of Classification Search
CPC .................................................. G06K 7/0008
USPC ....... 343/702; 455/41.1; 361/113; 340/572.1, 340/10.1; 331/117; 307/110; 320/108
See application file for complete search history.

(56) References Cited

U.S. PATENT DOCUMENTS

| | | | | |
|---|---|---|---|---|
| 4,480,178 A | * | 10/1984 | Miller et al. | 235/380 |
| 8,260,200 B2 | * | 9/2012 | Shimizu et al. | 455/41.1 |
| 2004/0065733 A1 | * | 4/2004 | Fukuoka | 235/435 |
| 2005/0178835 A1 | * | 8/2005 | Akiho et al. | 235/451 |
| 2007/0182367 A1 | * | 8/2007 | Partovi | 320/108 |
| 2007/0229262 A1 | * | 10/2007 | Rofougaran | 340/572.1 |

(Continued)

FOREIGN PATENT DOCUMENTS

| | | |
|---|---|---|
| JP | 5-128319 | 5/1993 |
| JP | 2005-73113 A | 3/2005 |
| JP | 2006-238398 | 9/2006 |
| JP | 2009-118071 A | 5/2009 |

OTHER PUBLICATIONS

Extended European Search Report Issued Jun. 18, 2012 in Patent Application No. 11183809.0.

(Continued)

*Primary Examiner* — Jeffery Hofsass
*Assistant Examiner* — Israel Daramola
(74) *Attorney, Agent, or Firm* — Oblon, Spivak, McClelland, Maier & Neustadt, L.L.P.

(57) ABSTRACT

An RFID module including an antenna element forming an RFID antenna; an RFID circuit block to which the antenna element is connected; and a first resonance frequency adjustment circuit having an element that includes a drain terminal connected to the antenna element, a gate terminal that is grounded, and a source terminal that is grounded, wherein a pull-up resistor is connected between the drain terminal and a power supply.

13 Claims, 21 Drawing Sheets

(56) References Cited

U.S. PATENT DOCUMENTS

| | | | |
|---|---|---|---|
| 2007/0236851 A1* | 10/2007 | Shameli et al. | 361/113 |
| 2007/0281657 A1* | 12/2007 | Brommer et al. | 455/334 |
| 2009/0098827 A1* | 4/2009 | Koyama | 455/41.2 |
| 2009/0108947 A1* | 4/2009 | Liu | 331/117 FE |
| 2009/0146892 A1 | 6/2009 | Shimizu et al. | |
| 2009/0152954 A1* | 6/2009 | Le et al. | 307/110 |
| 2009/0207037 A1* | 8/2009 | Wiberg et al. | 340/693.3 |
| 2009/0224893 A1* | 9/2009 | Kondo et al. | 340/10.51 |
| 2010/0001839 A1* | 1/2010 | Uchiyama et al. | 340/10.1 |
| 2010/0103055 A1* | 4/2010 | Waku et al. | 343/702 |
| 2011/0241837 A1* | 10/2011 | Suzuki | 340/10.1 |
| 2011/0273272 A1* | 11/2011 | Burke | 340/10.1 |
| 2012/0248186 A1* | 10/2012 | Chauvet | 235/439 |

OTHER PUBLICATIONS

Combined Chinese Office Action and Search Report issued Jul. 2, 2014 in Patent Application No. 201110389515.1 (with English language translation).

* cited by examiner

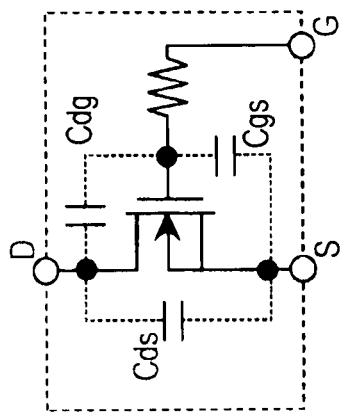
FIG. 8B
FIG. 8C
| Vds | 3 V | 1 V | 0.5 V |
|---|---|---|---|
| Ciss | 9.3 | 12 | 15 |
| Coss | 9.8 | 14 | 20 |
| Crss | 4.5 | 8 | 12 |
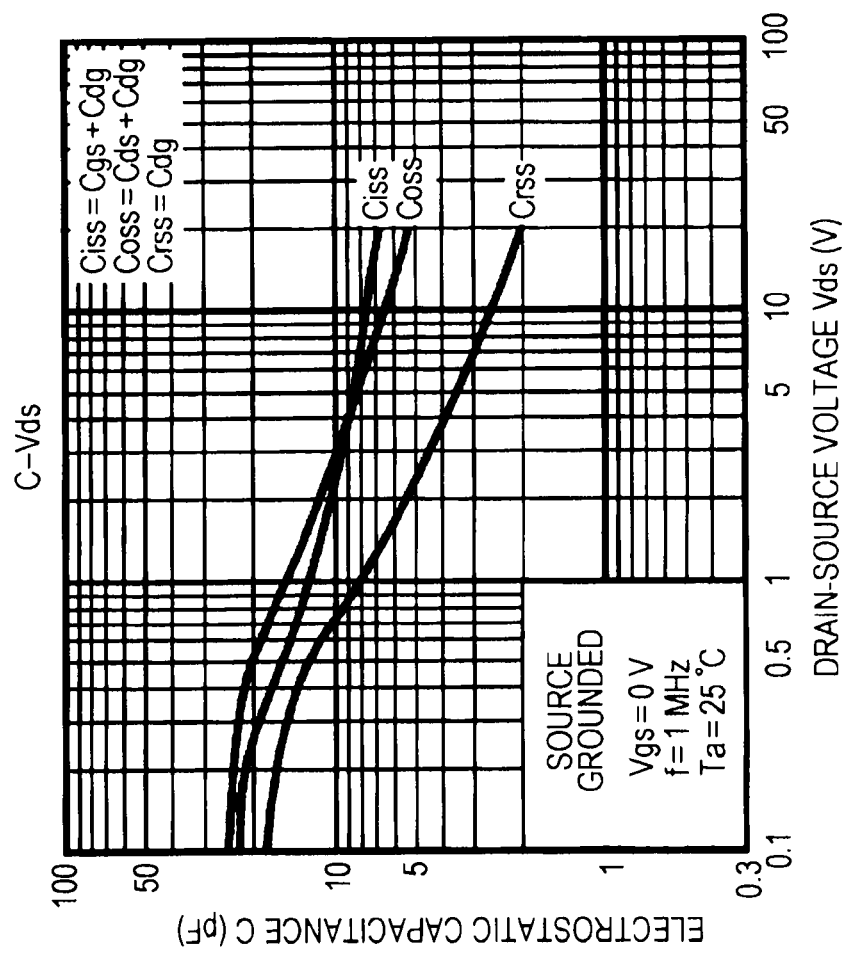
FIG. 8A

RFID MODULE

CROSS REFERENCE TO RELATED APPLICATIONS

This application is related to and claims priority under 35 U.S.C. §119(e) to Provisional Application Ser. No. 61,454,780, filed Mar. 21, 2011, the contents of which are hereby incorporated herein by reference.

BACKGROUND

1. Field

The present specification relates to RFID (Radio Frequency Identification) technology and, more particularly, to an RFID module that performs short distance wireless communication with a reader/writer, and to a portable device having this module incorporated thereinto.

2. Description of the Related Art

RFID technology is basically a technology that recognizes a moving body in a non-contact manner. An RFID system that performs short distance wireless communication among readers/writers and RFID modules is usually formed by using electromagnetic coupling, electromagnetic induction, radio waves, or the like.

As RFID modules of an electromagnetic induction method, card-shaped RFID modules that are used for various applications, such as electronic money, commuter passes, or employee ID cards, have become popular. In recent years, regarding functions of non-contact IC cards, portable devices, such as mobile phone terminals having such function incorporated therein, have been put onto the market.

In RFID systems, in such a function incorporated in portable devices in which metal is heavily used, the problem of "phase inversion null" has been known.

The term "null" in an RFID system refers to a phenomenon in which communication cannot be performed in spite of the fact that there is a sufficient distance (within a communicable range) to receive electric power necessary for communication, and there are various factors why such a null might occur. Phase inversion is one such factor. Null caused by phase inversion will be referred to as phase inversion null.

The term "phase" used herein refers to the phase of a waveform after an envelope is extracted from a carrier wave that has been modulated by amplitude shift keying (ASK). Since this phase differs from the phase of a 13.56 MHz carrier wave, hereinafter, this phase will be referred to as an "envelope phase" to avoid confusion.

Short distance wireless communication of an electromagnetic induction method is performed as a result of a device called a reader/writer (hereinafter will also be referred to as an R/W) that sends a carrier wave being magnetically coupled with an RF module that does not output a carrier wave by itself. In communication from an RF module to an R/W, the inversion of an envelope phase can easily occur depending on the state of magnetic coupling. Since an RF module typically has a card-like shape, hereinafter, the RF module will also be simply referred to as a card. However, in the manner described above, in a case where an RF module is incorporated into a portable device, of course, the RF module will not have a card-like shape.

When the envelope phase is inverted, the size of the amplitude in ASK modulation, and the relationship of high/low as digital data are inverted. Since a specific RFID protocol is created in such a manner that communication can be normally performed even if inversion occurs, the fact that the envelope phase is inverted in itself does not pose a problem. However, in a process at which the envelope phase becomes inverted, a point in which the difference between the large and small carrier wave amplitudes becomes zero with respect to high/low of the digital data exists. At this time, since the R/W cannot demodulate response data from the card, a null occurs.

FIG. 1 illustrates the relationship between the inversion of an envelope phase and the demodulation possible/not possible state. The waveform on the upper side of FIG. 1 represents data that is being transmitted by a card, the data being reflected in changes of the antenna current of the card. The waveform on the lower side of FIG. 1 represents a carrier wave waveform that appears in an antenna of an R/W. It can be seen that as the envelope changes from left to right in FIG. 1, inversion of the envelope phase occurs. At this inversion, the state of "demodulation is not possible" occurs.

Here, a description will be given briefly of a mechanism in which an envelope phase is inverted.

Data transfer in the direction from a card to an R/W is performed by a "load modulation method" that causes the load resistance of a card-side antenna to change. In such a load modulation method, high/low representation as digital data is performed by turning on/off an FET for load modulation, which is incorporated into an RFID circuit block (normally, chip configuration) on the card side. (Because Manchester code is used, "1" is indicated by high→low, and "0" is indicated by low→high). Hereinafter, the FET for load modulation will also be referred to as a load switch (load SW).

Since the R/W and the card in the middle of communication are magnetically coupled with each other, the change in the antenna current of the card due to the load SW is detected as an amplitude change of the carrier wave waveform in the antenna of the R/W. For this reason, the R/W performs demodulation by envelope detection in the same manner as for demodulation of an ASK modulation wave.

A description will be given of a model such that a state in which changes in the antenna current of a card are converted into changes in the antenna voltage of the reader/writer is simplified by magnetic coupling. FIG. 2($a$) illustrates main circuit units of an R/W and a card. In this figure, an RFID module of a non-contact IC card is referred to as a "card" for the sake of convenience. Inside the card, only transmission-related portions are shown, and the illustration of the other elements is omitted.

Blocks of "TNS" and "RCV" in the R/W indicate a transmission unit and a reception unit, respectively. FIG. 2($b$) illustrates an equivalent circuit in which an R/W and a card that are magnetically coupled are simplified. The voltage V1 of the R/W shown in FIG. 2($b$) corresponds to a voltage that is generated in the antenna of the R/W.

FIG. 2($b$) is a circuit diagram illustrating an equivalent circuit in which an R/W and a card that are magnetically coupled are simplified. In this figure, V1 corresponds to a voltage that is generated in the antenna of the R/W.

When V1 is represented by a circuit equation, V1 can be described as in following equation (1).

$$\underbrace{\dot{V}_1 = (j\omega L_1 + R_1) \cdot \dot{I}_1}_{\text{Voltage generated at antenna end by } \dot{I}_1 = a} + \underbrace{(-j\omega M \cdot \dot{I}_2)}_{\text{Voltage generated at antenna end by } \dot{I}_2 = b} \qquad \text{[Math. 1]}$$

It can be said from this equation (1) that the voltage V1 is an additive combination of a voltage a generated by current I1 and a voltage b generated by current I2 that flows through the card-side antenna. As a result of this, since I2 changes by the ON/OFF of the load SW, the conveyance of information by envelope detection is made possible.

Furthermore, the relationship between I1 and I2 in this equivalent circuit is represented by the following equation (2).

$$I_1 = \frac{I_2}{\omega M}\left(\omega L_2 - \frac{1}{\omega C_2} - jR_2\right) \quad \text{[Math. 2]}$$

As a result, it may be said that the phase difference between I1 and I2 is influenced by the relationship among L2, R2, and C2 (≈resonance frequency of the card).

Here, the following point become a problem. That is, regarding the phase difference between the voltage waveforms a and b, the voltage a is influenced by the relationship between L1 and R1, and the voltage b is influenced by the relationship among L2, R2, and C2. For this reason, as a result, the voltage V1 becomes such that two sine waves having a mutual phase difference are additively combined. When two sine waves are to be additively combined, if the mutual phase relationship is in phase, the levels of the waveforms are directly added. If the phase relationship is in opposite phase, the levels of the waveforms are subtracted. In an intermediate state between in-phase and opposite phase, a phase relationship in which the level of the waveform does not change exists, with the result that the change of the amplitude of ASK after combination is lost.

FIG. 3 illustrates an example of a waveform using a channel (ch) additive combination function of an oscilloscope as a reference for the purpose of explaining a voltage V1 that is generated in an antenna of an R/W. This illustrates that the waveform of ch1 in which the voltage a is assumed and the waveform of ch2 in which the voltage b is assumed are combined. The range of the time axis is changed to show the same waveform in the upper half and the lower half of FIG. 3 show the same waveform. The upper half shows a waveform in the carrier wave range (50 nsec/div), and the lower half shows a waveform in the ASK modulation range (2 μsec/div). Furthermore, the left portion of FIG. 3 represents the state at the time when the waveforms are completely in opposite phase, the right side portion of FIG. 3 represents the state at the time when the waveforms are completely in phase, and the central portion represents the halfway state (null) that is intermediate between them.

Next, a description will be given of a relationship between a resonance frequency and a position at which a null of a portable device having a non-contact IC card function easily occurs (that is, incorporating an RFID module therein).

What particularly becomes a problem in the case of a portable device in which a metal is heavily used is a variation in the self-inductance (L1) of the R/W antenna. A magnetic flux forming a self-inductance (L1) of an R/W antenna is cancelled by an eddy current that is generated in a metal surface (accurately, a conductor of a plane shape in general), such as the housing of an electronic apparatus or the GND plane of a substrate. For this reason, the self-inductance of the R/W antenna as the portable device comes close to the R/W antenna is greatly decreased. At the same time, the phase relationship of the voltage b with respect to the voltage a varies to the leading side.

In a case where the amount of variation of the carrier wave phase cannot be contained within a range in which a null does not occur, communication cannot be performed in the vicinity of a position at which the portable device is in close contact with the R/W.

FIG. 4 is a graph indicating actually measured examples of variations of the L value when a portable device is made to come close to a loop antenna. The horizontal axis of this graph represents the distance (mm) from the portable device up to the loop antenna, and the vertical axis represents the inductance value (μH) of the self-inductance (L1) of an R/W antenna. Since the arrangement and the area of the metal body differs depending on what portable device is made to come close to the R/W, the magnitude of the influence that is exerted on the opposing R/W device differs. However, it can be seen that even if the devices are different, the inductance value tends to decrease with a decrease in the distance.

In the R/W, when, in particular, the resonance frequency (hereinafter denoted as f0) of the portable device is high as a result of the inductance of the R/W antenna being decreased when the portable device comes close, since the phase relationship of the voltage b with respect to the voltage a is such that both voltages are in the leading direction, unfavorable conditions coincide one another, and a null is easily generated.

With such a mechanism, the relationship between f0 of the portable device and the communication distance at which a null easily occurs has a tendency shown in the graph of FIG. 5.

FIG. 5 is a graph illustrating the relationship between the resonance frequency of a portable device and a communicable area. The horizontal axis of this graph represents the resonance frequency f0 (MHz) of the portable device, and the vertical axis represents the communication distance (mm), that is, the distance from the portable device up to an R/W. The right bar of a pair of adjacent bars for each value of the resonance frequency of the portable device indicates the communicable position of the portable device with respect to the R/W in which f0 is low. The left bar indicates the communicable position of the portable device with respect to the R/W in which f0 is high. The black bar portion of the lower right area of the figure indicates the position at which a null has occurred.

With regard to the resonance frequency f0 of the R/W, variations due to individual differences among individual devices are assumed. As can be seen from FIG. 5, communication is not possible between an area R1 of a more distant place for the combination of an R/W whose resonance frequency f0 is low and a portable device whose resonance frequency f0 is low and an area R2 of a more distant place for the combination of an R/W whose resonance frequency f0 is high and a portable device whose resonance frequency f0 is high. In addition to this, for the combination of the R/W whose resonance frequency f0 is high and the portable device whose resonance frequency f0 is high, it is easier for a null to occur in an area R0 in the vicinity of close contact with the R/W. In particular, since the occurrence of a null in the area R0 in the vicinity of this close contact is a phenomenon contrary to the intuition of the user who would expect "the smaller the distance, the easier communication will be", this is directly connected to the worsening of usability.

Therefore, normally, it is necessary to strictly manage the resonance frequency f0 of the portable device so that the communication distance thereof satisfies the specification and falls within the range (hereinafter referred to as an allowable range) in which a null does not occur. However, the resonance frequency f0 is also influenced by not only variations in the parts such as a loop antenna and a tuning capacitor, but also by mechanical structure-like variations and assembly variations in manufacturing steps, such as the positional relationship between a loop antenna and the GND plane of a substrate. For this reason, the variation range of the resonance frequency f0 due to the mass production of portable devices often exceeds the allowable range thereof. In order to manage the variation range to be within a narrow band, it is necessary to sacrifice the cost of parts and takt time in manufacturing steps, such as the conversion into an f0 adjustment circuit based on more number of bits or adjustments using a trimmer capacitor.

Hitherto, regarding the null problem, it is comparatively easy to take measures on the reader/writer device side than to perform null measures on the card side, and measures within the reader/writer device have already been put into the market. On the other hand, reader/writer devices for which measures have not been taken have already become popular in large quantities, and it is preferable that a null is not generated in communication with those reader/writer devices. For this reason, there has been a demand for null measures on the card side.

As a method of the related art for taking measures on the card side, there is a technology disclosed in PTL 1. FIG. 19 illustrates an overall configuration of a portable device according to such a method of the related art. In this method of the related art, a level detection unit 15 provided in a mobile terminal detects the level of the antenna excitation voltage of a loop antenna 11, and ON/OFF control of an FET 16 is performed in accordance with the level detection unit output, thereby selectively adding the capacitance of a capacitor 17 to the capacitance of the capacitor 12 forming a resonance circuit together with the antenna 11. With this arrangement, control of decreasing the resonance frequency when the mobile terminal comes close to the R/W is performed.

As the internal configuration of the level detection unit 15, in general, processes are performed as follows with the circuit configuration shown in the figure. That is, the excitation voltage of the loop antenna 11 is converted into a DC voltage by a rectification diode 152 in a rectification unit 151, and an increase in this DC level is detected by using a comparator 153 or the like. An FET switch 16 is subjected to ON/OFF control in accordance with the detection output of the comparator 153.

CITATION LIST

Patent Literature

[PTL 1] Japanese Unexamined Patent Application Publication No. 2006-238398

In the related art disclosed in PTL 1 described above, there are problems such as those described below.

Firstly, since the number of parts is large, adoption thereof in a portable device is difficult in terms of the cost and the mounting area.

Secondly, since the rectification unit 151 is necessary in the level detection unit 15, in a case where other transmission waves for wireless communication, such as GSM, are superposed in an antenna for RFID, spurious components may be generated in the diode 152 of the rectification unit 151.

In such a background, the inventors of the present application have recognized the necessity of providing an RFID module having a new configuration, which is capable of expanding the allowable resonance frequency range, and a portable device using this module at a comparatively low cost.

BRIEF SUMMARY

An RFID module according to an embodiment includes an antenna element forming an RFID antenna; an RFID circuit block to which the antenna element is connected; and a resonance frequency adjustment circuit that adjusts the resonance frequency of the RFID antenna, the resonance frequency adjustment circuit being connected to the antenna element. The resonance frequency adjustment circuit includes an element, such as an FET, that includes a drain terminal connected to the antenna element, a gate terminal that is grounded, and a source terminal that is grounded, wherein a pull-up resistor is connected between the drain terminal and a power supply. The resonance frequency adjustment circuit may also include a capacitor having its one end connected to one end of the antenna element, and the FET having its drain terminal connected to the other end of the capacitor.

On the basis of the voltage excited in the RFID antenna when the RFID module comes close to the R/W device, when an AC waveform of a predetermined amplitude or more is input, a decrease of the DC level of the drain terminal occurs through the capacitor. On the basis of this, the drain-source parasitic capacitance value increases. As a result, the resonance frequency of the loop antenna shifts toward lower frequencies. As a result, a null that occurs in the vicinity of the R/W is avoided.

The resonance frequency adjustment circuit may further include another capacitor having its one end connected to a connection point of the capacitor and the FET and having the other end grounded. As a result, the hysteresis property of resonance frequency characteristics can be enhanced, eventually stabilizing the resonance frequency.

First and second resonance frequency adjustment circuits that are provided in one end and the other end of the antenna element, respectively, may be included. As a result, it is possible to maintain the equilibrium of the RFID antenna of an equilibrium method.

In the RFID module, a resistor that is connected to a corresponding gate terminal of each of FETs of the first and second resonance frequency adjustment circuits includes first and second resistors that are connected in series with each other. The RFID module may further include a first passive element that is connected between the connection point of the first and second resistors in the first resonance frequency adjustment circuit and the drain terminal of the FET in the second resonance frequency adjustment circuit, and a second passive element that is connected between a connection point of the first and second resistors in the second resonance frequency adjustment circuit, and the drain terminal of the FET in the first resonance frequency adjustment circuit. As a result, it is possible to adjust the threshold value of a communication distance at which a shift of the resonance frequency occurs.

The gate terminal of the FET may be connected to an IO port capable of switching an output thereof between high and low through the resistor.

A portable device according to another embodiment includes a display unit that provides a display interface to a user, an operation unit that provides an input interface to the user, an RFID unit, and a control unit that performs the control of each unit and necessary data processing. The RFID unit includes an antenna element forming an RFID antenna, an RFID circuit block to which the antenna element is connected, and a resonance frequency adjustment circuit that is connected to the antenna element and that adjusts the resonance frequency of the RFID antenna. The resonance frequency adjustment circuit includes an element, such as an FET, that includes a drain terminal connected to the antenna element, a gate terminal that is grounded, and a source terminal that is grounded, wherein a pull-up resistor is connected between the drain terminal and a power supply. The resonance frequency adjustment circuit may also include a capacitor having its one end connected to one end of the antenna element, and the FET having its drain terminal connected to the other end of the capacitor.

According to another embodiment, a communication method is provided for an RFID module having an antenna element forming an RFID antenna, an RFID circuit block to which the antenna element is connected, and a resonance frequency adjustment circuit. The method includes connecting a source grounded element of the resonance frequency adjustment circuit to one end of the antenna element; pulling up a drain terminal of the source grounded element to a power-supply voltage through a pull-up resistor; and grounding the gate terminal of the source grounded element.

According to the present embodiments, it becomes possible to greatly suppress the occurrence of phase inversion null with respect to old-type reader/writer devices. In particular, it is possible to provide an RFID module having a new configuration, which is capable of expanding the allowable resonance frequency range, and a portable device using this module at a comparatively low cost.

BRIEF DESCRIPTION OF THE DRAWINGS

FIG. 8 illustrates an example of characteristics indicating the relationship between a drain-source voltage of an FET and the capacitance value of the parasitic capacitance of each unit of the FET.

DETAILED DESCRIPTION

Preferred embodiments will be described below in more detail with reference to the drawings. In the present embodiment, a description will be given by using as an example FeliCa (registered trademark of Sony Corporation) as a typical RFID system of an electromagnetic induction method. However, the embodiment is not particularly limited to this. For example, the present embodiment can be applied to NFC (Near Field Communication), or any other RFID systems.

Figure 1:
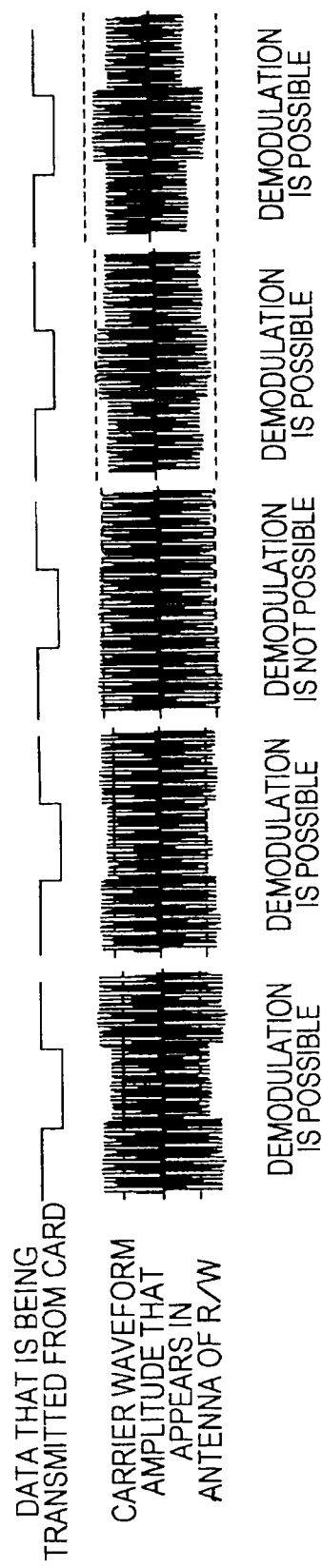
FIG. 1 illustrates the relationship between the inversion of an envelope phase and the demodulation possible/not possible state in an RFID system.
Figures 2A, 2B:
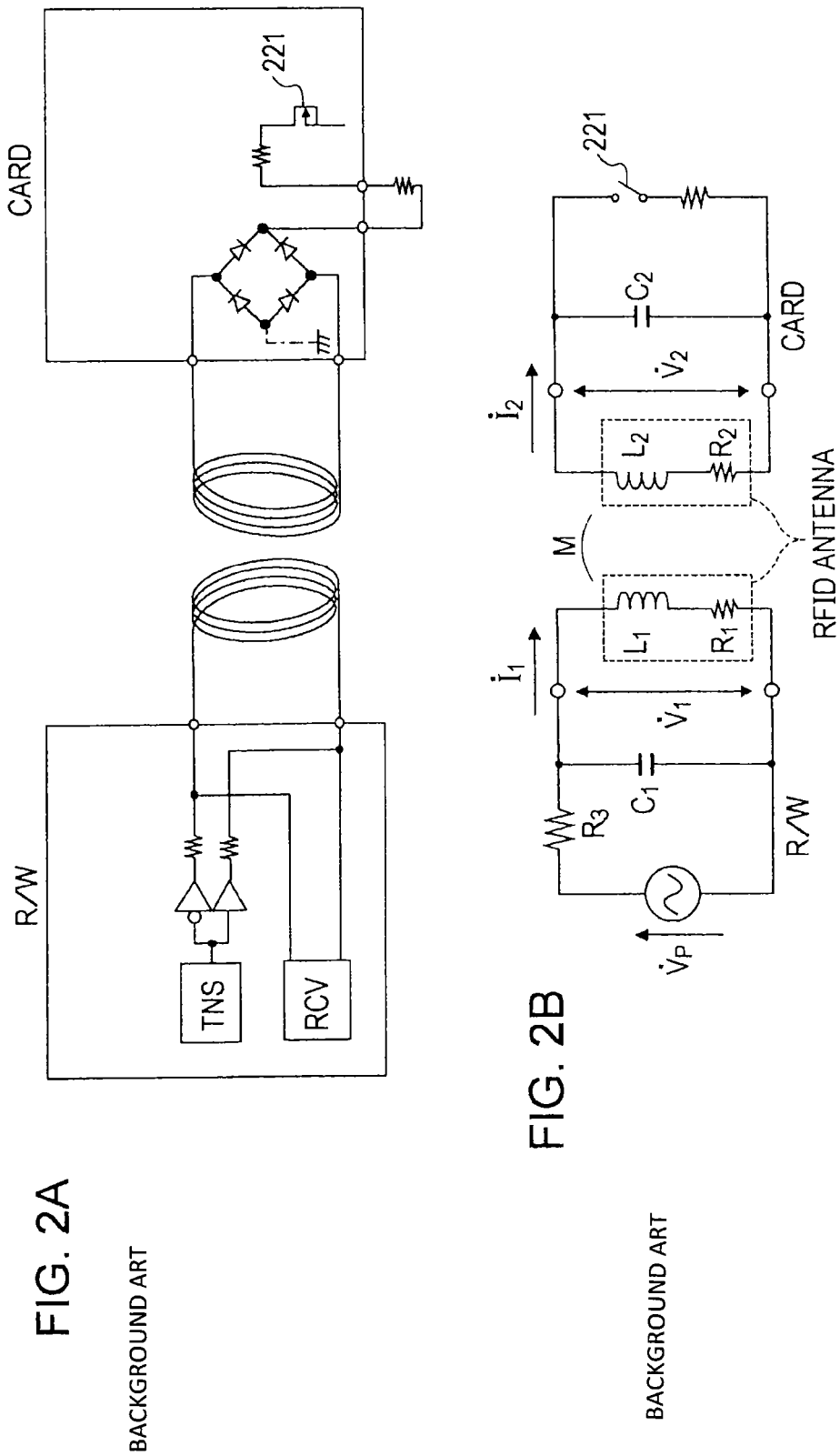
FIG. 2 is an equivalent circuit illustrating an equivalent circuit in which an R/W and a card that are magnetically coupled with each other is simplified.
Figure 3A:
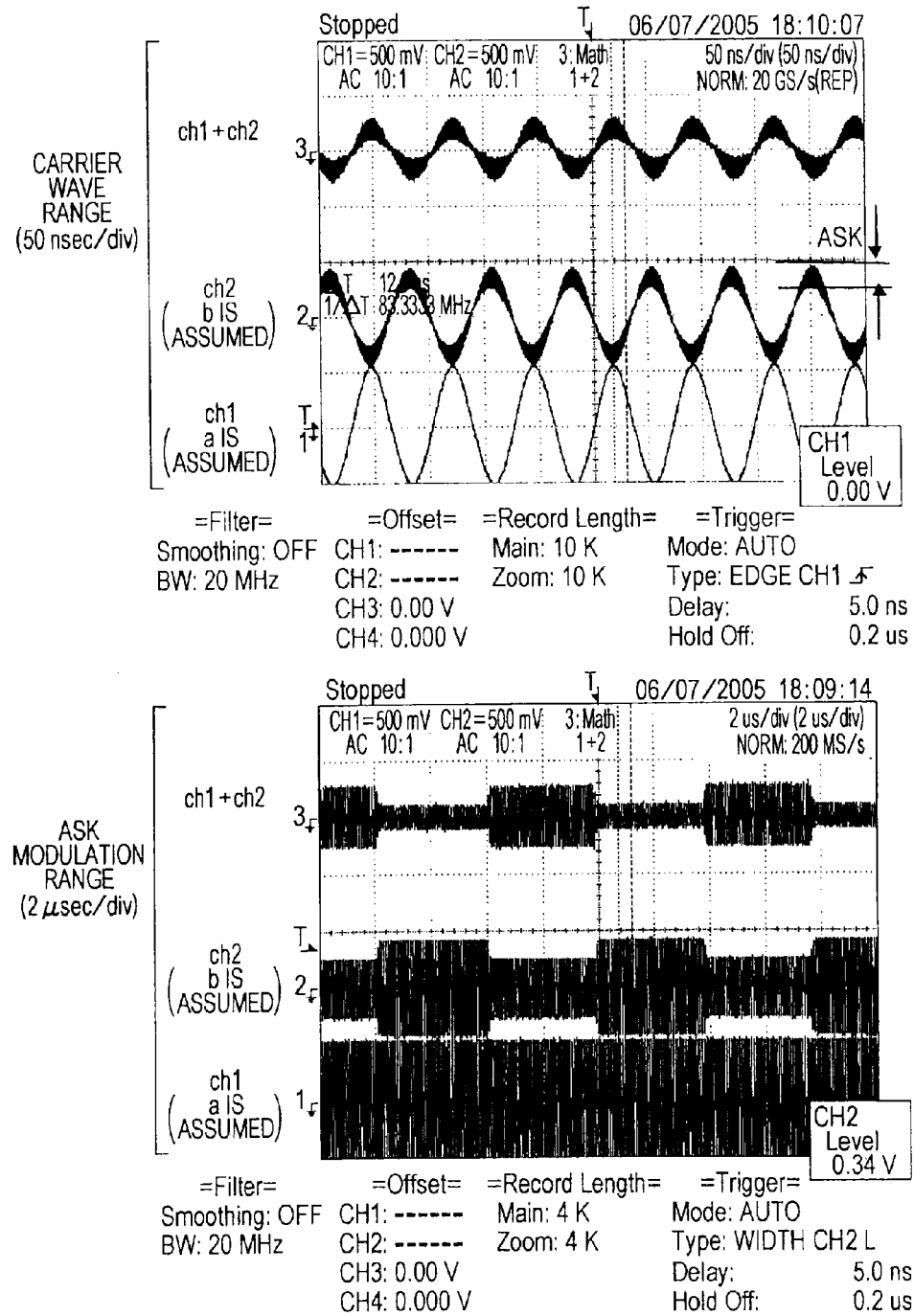
FIG. 3 illustrates an example of a waveform using a channel (ch) additive combination function of an oscilloscope for the purpose of explaining a voltage V1 that is generated in an antenna of an R/W.
Figure 3B:
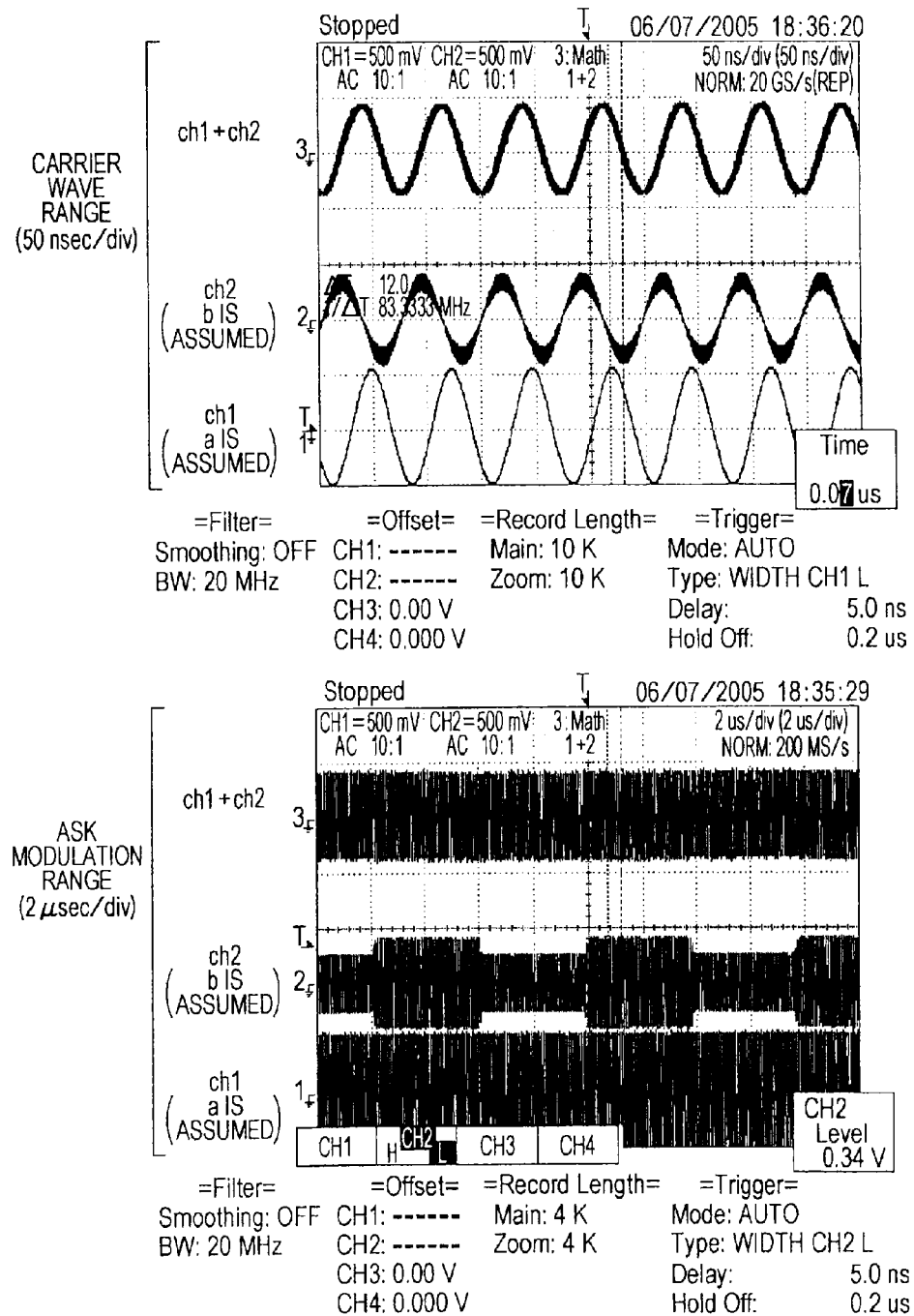
Figure 3C:
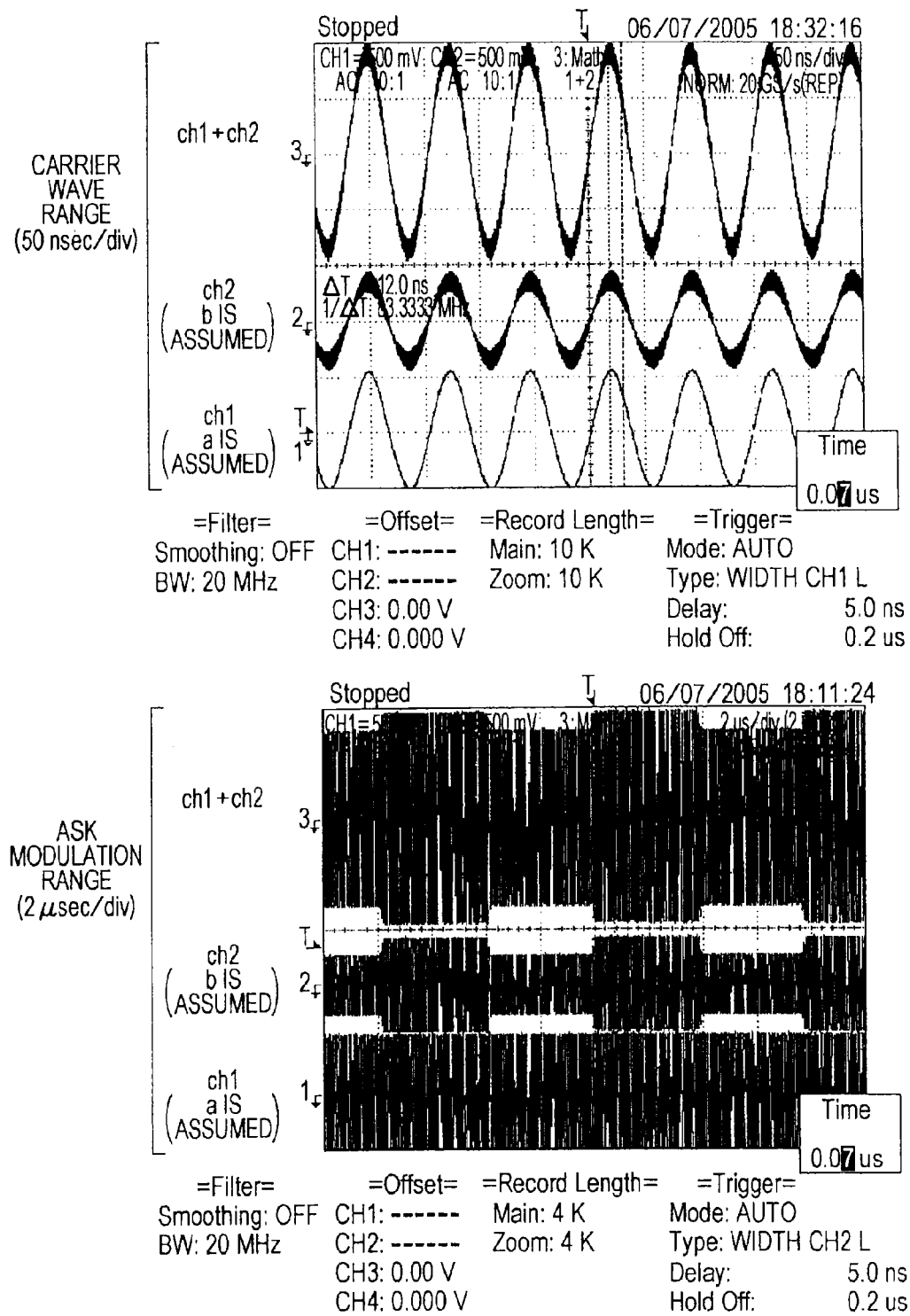
Figure 4:
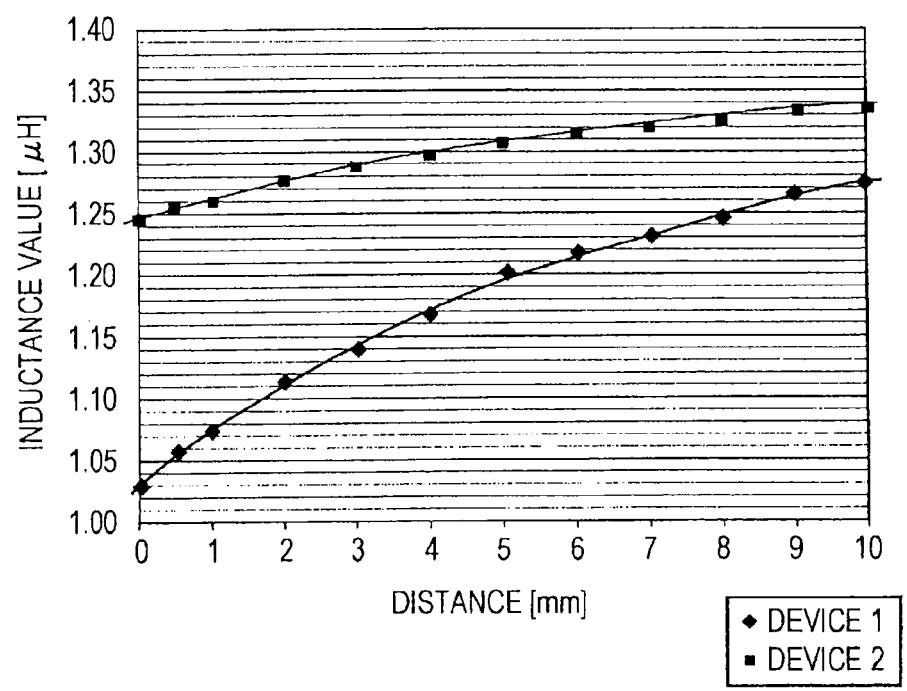
FIG. 4 is a graph illustrating actually measured examples of variations of the L value when a loop antenna is made to come close to a portable device.
Figure 5:
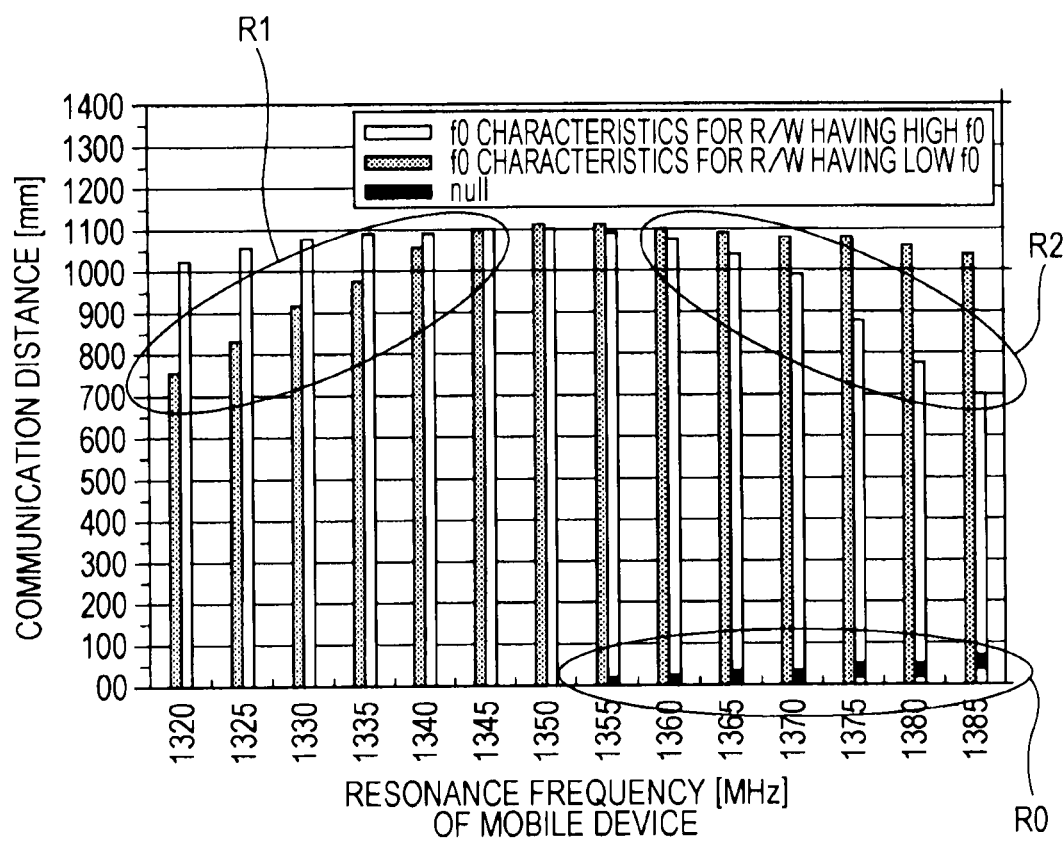
FIG. 5 is a graph illustrating the relationship between the resonance frequency of the portable device and the communicable area thereof.

In the null occurrence tendency such as that shown in FIG. 5, if the resonance frequency f0 of the portable device can be dynamically shifted automatically toward lower frequencies when the portable device comes close to the R/W, it is possible to markedly expand the allowable resonance frequency range of the portable device.

Figure 6A:
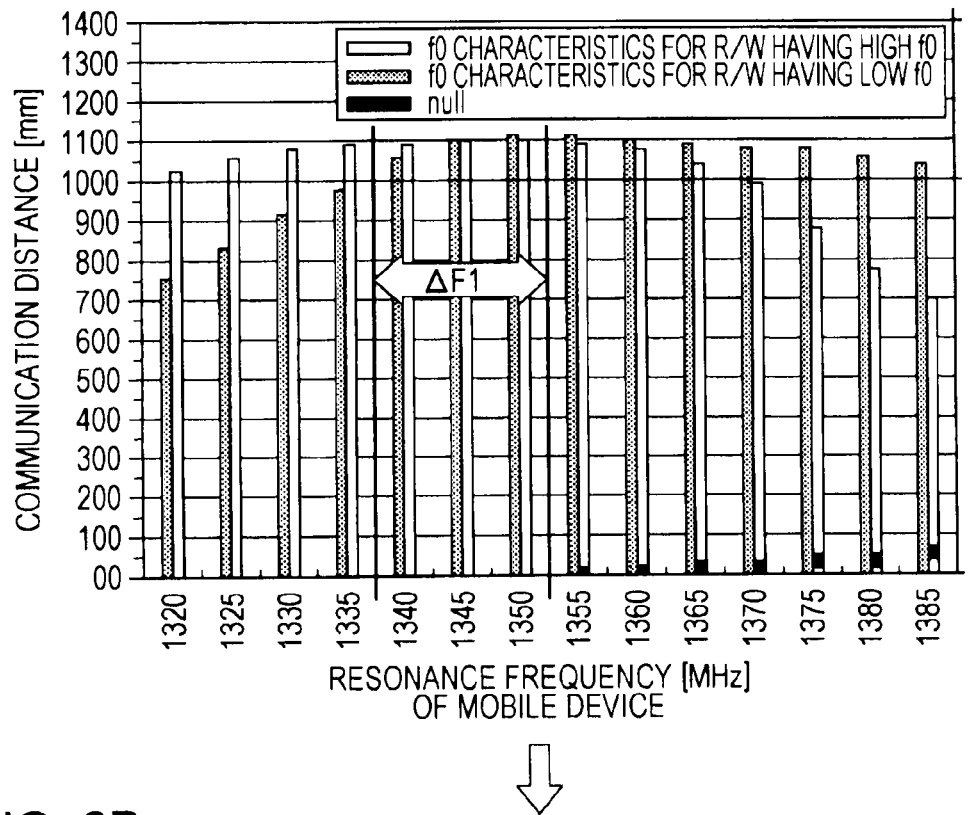
FIG. 6 illustrates before and after applications of improvements by the embodiment in the graph shown in FIG. 5.
Figure 6B:
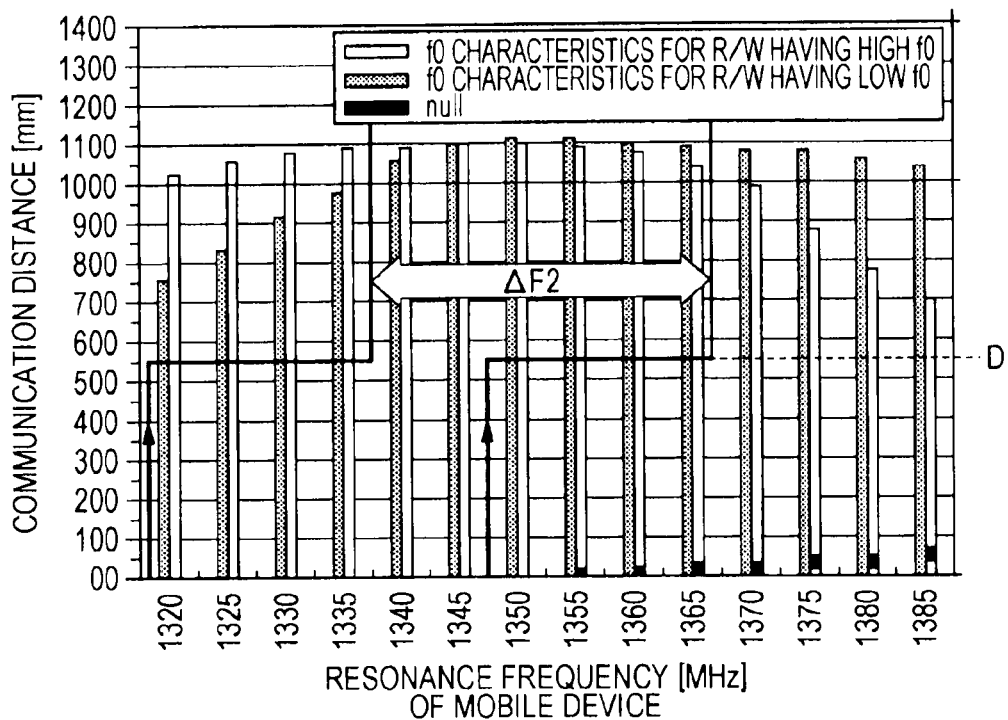

FIGS. 6(a) and 6(b) are illustrations illustrating before and after applications of improvements by the embodiment in the graph shown in FIG. 5. For example, when the portable device moves across a threshold distance D from a position far from the predetermined threshold distance D to a position near the R/W, the resonance frequency of the portable device moves toward lower frequencies in the vicinity of the threshold distance D. Whereas the allowable resonance frequency range in a case where the shift of the resonance frequency corresponding to the communication distance (FIG. 6(a)) is ΔF1, the allowable resonance frequency range in a case where the shift occurs (FIG. 6(b)) becomes ΔF2 sufficiently larger than ΔF1. The expansion of the allowable resonance frequency range in the manner described above contributes to the reduction in the number of bits of the f0 adjustment circuit, the reduction of the takt time of the manufacturing step, and the like.

Figure 7:
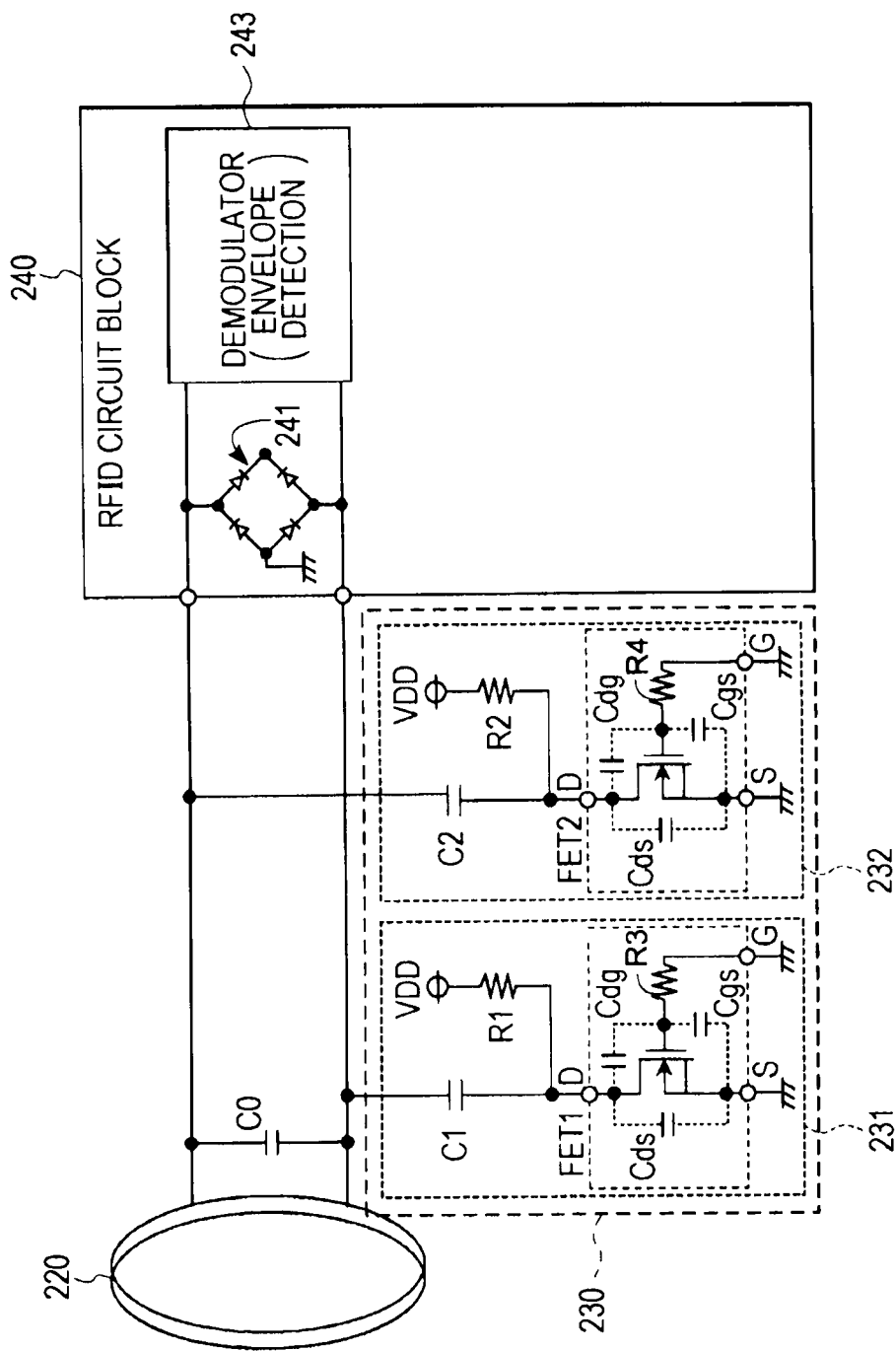
FIG. 7 illustrates an example of the configuration of an RFID module according to a first embodiment.

FIG. 7 illustrates an example of the configuration of an RFID module according to the first embodiment.

This RFID module is usually constituted by an antenna element forming a loop antenna 220 as an RFID antenna, and an RFID circuit block 240 to which the antenna element is connected. In order to achieve parallel resonance with the inductance of the loop antenna 220, tuning capacitors C0 are provided between the antenna lines at both ends of the loop antenna 220. In the present embodiment, furthermore, the RFID module includes a resonance frequency adjustment unit 230 that is connected to both ends of the antenna element and that adjusts the resonance frequency of the RFID antenna. This resonance frequency adjustment unit 230 includes a first resonance frequency adjustment circuit 231 and a second resonance frequency adjustment circuit 232.

The RFID circuit block 240 includes a rectification unit 241 that receives a voltage excited across both ends of the loop antenna 220 and performs rectification, a demodulation unit 243 that similarly receives the excited voltage and performs envelope detection, and the like. The configuration of such an RFID circuit block 240 is known in itself, and the RFID circuit block 240 can be formed by an existing LSI for RFID.

The first resonance frequency adjustment circuit 231 of the resonance frequency adjustment unit 230 includes a capacitor (DC-cut capacitor) C1 having its one end connected to one end of an antenna element, an electric field effect transistor FET 1 having its drain terminal (D) connected to the other end of the capacitor C1 and having its source terminal (S) grounded, and a pull-up resistor R1 having a comparatively high resistance value, which is connected between the drain terminal of the FET 1 and the power supply (power-supply voltage VDD). The gate terminal (G) of the FET 1 is grounded through a resistor R3.

Similarly, the second resonance frequency adjustment circuit 232 of the resonance frequency adjustment unit 230 includes a capacitor (DC-cut capacitor) C2 having its one end connected to the other end of the antenna element, an electric field effect transistor FET 2 having its drain terminal D connected to the other end of the capacitor C2 and having its source terminal S grounded, and a pull-up resistor R2 having a comparatively high resistance value, which is connected between the drain terminal of the FET 2 and the power supply (power-supply voltage VDD). The gate terminal G of the FET 2 is grounded through a resistor R4.

The operations of the first and second resonance frequency adjustment circuits 231 and 322 are the same as each other. Accordingly, hereinafter, a description will be given mainly of the first resonance frequency adjustment circuit 231.

Since the gate terminal G of the FET 1 is grounded through the resistor R3, the FET 1 is set in an OFF state. The drain terminal D of the FET 1 that is set in the OFF state in the same manner is pulled up to the power-supply voltage by the resistor R1 of a high resistance value. In this state, the AC components of the carrier wave that is excited at both ends of the loop antenna 220 are supplied to the drain terminal D.

When the card-side device, that is, the portable device, comes close to the R/W, the amplitude of the carrier wave that is excited in the antenna is increased, and the AC amplitude that is applied to the drain terminal D is also increased. The AC waveform that is applied to the drain terminal D is transmitted to the gate terminal G through a feedback capacitance (Cdg) of the FET 1. Consequently, the FET 1 shifts from a completely OFF state to a state in which drain cutoff current slightly flows. As a result, the DC potential of the drain terminal D that is pulled up by the pull-up resistor R1 of the high resistance value is decreased.

The drain-source capacitance (Cds) has DC bias characteristics, that is, changes in dependence of DC bias. The decrease in the DC potential of the drain terminal D causes the drain-source capacitance (Cds) to be increased. As a consequence, the resonance frequency f0 of the antenna decreases. With these series of operations, it is possible to decrease the resonance frequency of the card-side antenna when the device comes close to the R/W.

In order to maintain the equilibrium of the antenna, the first and second resonance frequency adjustment circuits 231 and 232 are formed in a symmetric manner with respect to both ends of the antenna element. Unless the RFID circuit block 240 to be used employs an equilibrium method, a single resonance frequency adjustment circuit may be provided with respect to one of the antenna lines on the side in which the excitation voltage is high.

Furthermore, although a type of FET in which a resistor is incorporated in the gate terminal is assumed, a resistor element may be externally provided in a case where an FET in which a resistor is not incorporated is to be used. As measures of the constants of elements, for example, C1 and C2=approximately 5 to 20 pF, R1 and R2=approximately 1 MΩ, and C0=such value as to resonate near 13.56 MHz, together with the L value of the antenna.

Here, a typical operation of the RFID module of FIG. 7 will be described.

Since the gate terminal of the FET 1 is connected to the GND, the FET 1 is always in the OFF state, and the drain current becomes substantially zero at standby. For this reason, the DC potential of the drain terminal of the FET 1 becomes substantially equal to the power-supply voltage VDD of the pull-up destination. The constants of R1 and R2 are set in advance to as high resistance values as possible in a range in which a significant voltage drop does not occur with respect to the drain cutoff current when the gate voltage=0 V.

When the portable device is moved near the R/W, a carrier wave is excited in the antenna terminal, and the AC components of the carrier wave are superposed on the drain terminal of the FET 1 through the DC-cut capacitor C1. At this time, the AC components are transmitted to the inside of the gate terminal D through a feedback capacitance Cdg of the FET 1. While the amplitude of the AC components is sufficiently small, the FET 1 maintains a complete OFF state, and an AC waveform with the VDD potential being at the center appears in the drain terminal of the FET 1.

When the portable device comes close to the R/W, the amplitude of the AC waveform applied to the drain terminal increases with the distance to the R/W. At this time, the amplitude of the AC waveform that is transmitted to the inside of the gate terminal through the capacitance Cdg also increases. When this amplitude reaches a predetermined level, the drain current begins to slightly flow, and the DC potential of the drain terminal D is decreased in accordance with the value of the pull-up resistor R1. The variation of the DC potential increase with respect to the change of the drain current with an increasing pull-up resistance value.

Here, FIG. 8 illustrates an example of characteristics showing the relationship between the drain-source voltage of the FET and the capacitance value of the parasitic capacitance of each unit of the FET. FIG. 8(a) is a graph illustrating the relationship between the drain-source voltage Vds (V) of the FET and each of the electrostatic capacitances C (pF) of Ciss, Coss, and Crss. Here, as shown in FIG. 8(b), the FET develops mutual parasitic capacitances Cds, Cdg, and Cgs among the drain terminal D, the source terminal S, and the gate terminal G thereof. The relationship between the parasitic capacitances Cds, Cdg, and Cgs, and Ciss, Coss, and Crss is defined as follows.

$$Ciss=Cgs+Cdg$$

$$Coss=Cds+Cdg$$

$$Crss=Cdg$$

FIG. 8(c) illustrates a specific example of capacitance values (pF) of capacitances Ciss, Coss, and Crss with respect to a specific voltage value of a drain-source voltage Vds in the source grounded FET under the condition in which Vgs=0 V, f=1 MHz, and Ta=25° C.

As deduced from this specific example, in general, the capacitance value of each unit decreases with an increasing drain-source voltage Vds. Although the absolute value of the capacitance differs depending on the type of FET, the relationship that the capacitance decreases with an increase of an electrical potential difference is a typical property. Due to this property, in the FET in which the DC potential of the drain terminal D is decreased, the capacitance value of each unit increases. If the VDD is approximately 3 V, Ciss in a case where the DC potential of the drain terminal D is decreased to approximately 0.5 V changes (increases) from 9.3 pF to 15 pF, Coss changes (increases) from 9.8 pF to 20 pF, and Crss changes (increases) from 4.5 pF to 12 pF.

Figure 9A:
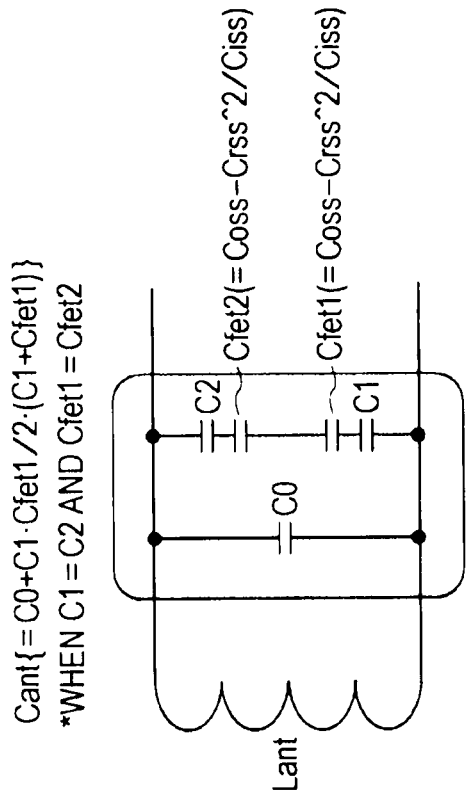
FIG. 9 illustrates an influence of the FET capacitance onto a parallel resonance circuit.
Figure 9B:
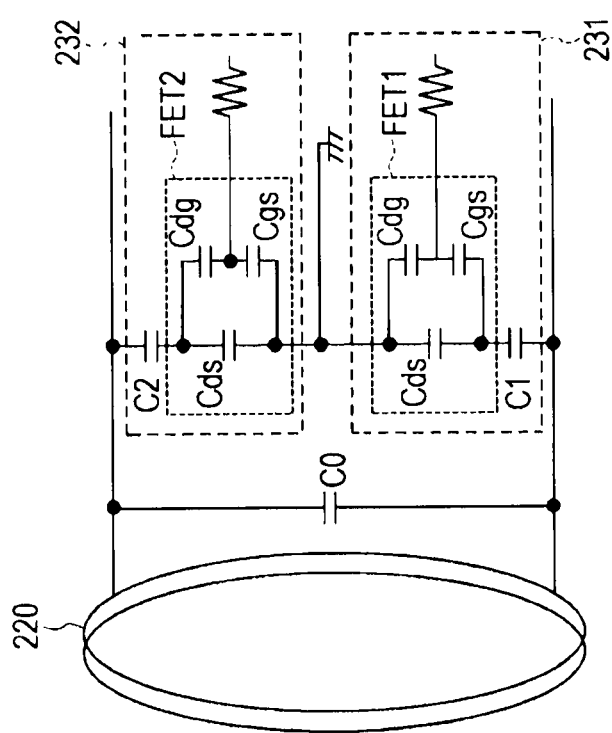

Next, a description will be given, with reference to FIG. 9, of an influence of FET capacitance to a parallel resonance circuit. FIG. 9(a) illustrates the connection relationship of the capacitances of the RFID module of FIG. 7. FIG. 9(b) is an illustration in which this connection relationship is simplified as a parallel resonance circuit.

The capacitances of the parts of the FET in the first embodiment forms a closed circuit with respect to the loop antenna 220 through the GND, as shown in FIG. 9(a). For this reason, the capacitances of the parts of the FET act as a plurality of capacitors inserted in parallel with C0, and forms a part of the parallel resonance circuit. In a case where the combined capacitance (hereinafter referred to as Cfet 1) of Cds, Cdg, and Cgs of the FET 1, and the combined capacitance (hereinafter referred to as Cfet 2) of Cds, Cdg, and Cgs of the FET 2 are increased, since the resonance frequency f0 of the antenna is represented by equations below, f0 changes to lower frequencies due to an increase in the capacitance.

The resonance frequency of the antenna: $f0 = 1/2\pi\sqrt{(Lant \cdot Cant)}$

The combined capacitance of the antenna: $Cant = C0 + \{C1 \cdot Cfet1/2 \cdot (C1+Cfet1)\}$ where C1=C2, and Cfet 1=Cfet 2.

The combined capacitance of the FET:
$Cfet1 = Cfet2 = Coss - Crss^2/Ciss$ where Crss^2 indicates the square of Crss.

In a case where a change from 9.3 pF to 15 pF of Ciss, a change from 9.8 pF to 20 pF of Coss, and a change from 4.5 pF to 12 pF of Crss, which are given in the previous examples, are used, Cfet 1 and Cfet 2 change from 7.6 pF to 10.4 pF, and the capacitance value increase by 2.8 pF.

At this time, when it is assumed that the inductance value of the loop antenna is 2.5 µH, C0=51 pF, and C1=C2=22 pF, the resonance frequency f0 when the combined capacitance of Cds, Cdg, and Cgs change from 7.6 pF to 10.4 pF changes from 13.721 MHz to 13.631 MHz. That is, f0 shifts by 90 kHz toward lower frequencies.

When the drain currents of both the FET 1 and the FET 2 increase to a certain degree, the amplitude of the AC waveform that appears in the drain as a consequence of a decrease in the drain-source resistance value decreases. Consequently, with this usage, the FET will not reach a complete ON state.

According to the above-described first embodiment, in a portable device having an RFID function installed therein, by using DC bias characteristics possessed by the drain-source capacitance (Cds) of the FET, it is possible to shift the resonance frequency of the RFID antenna toward lower frequencies only when the carrier wave level is high. As a result, by utilizing characteristics possessed by the FET, desired advantages can be obtained with a very small number of parts.

As described above, in the present embodiment, a phenomenon is used in which when an AC waveform of 13.56 MHz is applied to the drain terminal of the FET that is controlled at an OFF state, the drain cutoff current slightly increases in response to the amplitude of the AC waveform.

A first function of the present embodiment is to detect the amplitude level of the AC waveform as a result of the DC potential of the drain terminal being changed (decreased) due to a change in the voltage division ratio with respect to the pull-up resistor that is connected to the drain terminal as a consequence of an increase in the drain cutoff current.

A second function of the present embodiment is to perform AC level-capacitance conversion that converts the amplitude level of the AC waveform into a capacitance value by using the property that the drain-source parasitic capacitance value is increased on the basis of the decrease in the DC level of the drain terminal, which occurs when an AC waveform of a predetermined amplitude or more is input.

A third function of the present embodiment is to avoid a null that occurs in the vicinity of the R/W by shifting the resonance frequency of the loop antenna toward lower frequencies when a predetermined carrier wave intensity or higher is received on the basis of the second function.

Figure 10:
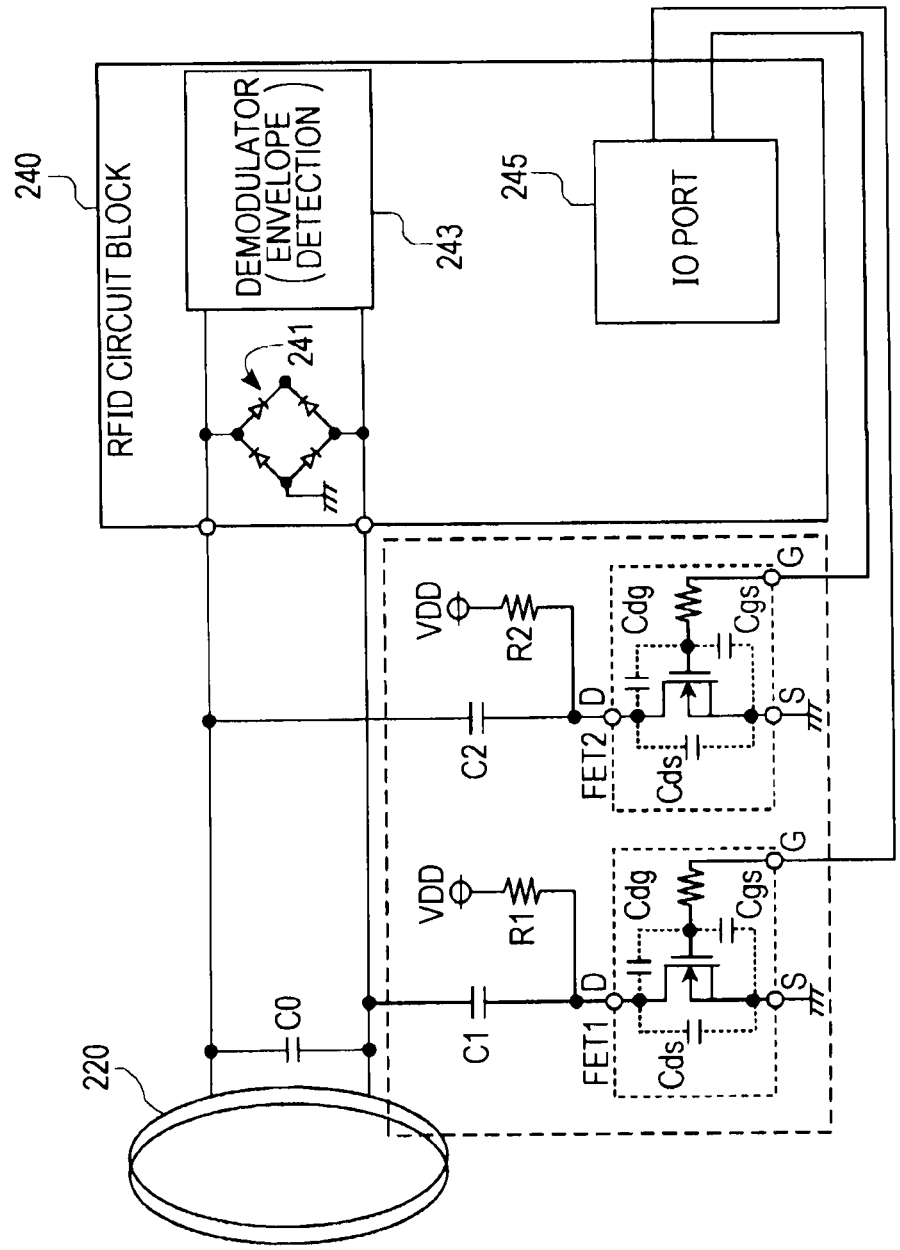
FIG. 10 illustrates a modification of the first embodiment.

Next, a modification of the first embodiment will be described with reference to FIG. 10. FIG. 10 illustrates the configuration of a modification of the first embodiment. In this figure, components, which are the same as components shown in FIG. 7, are designated with the same reference numerals, and repeated description thereof is omitted.

In the first embodiment, the gate terminals of the FET 1 and the FET 2 are directly dropped to the GND. In comparison, in this modification, the gate terminal is connected to the input/output port (IO port) of the RFID circuit block 240. This IO port can be switched to one of the outputs high and low and set by a control unit (not shown) inside or outside the RFID circuit block 240. During the inspection of shipment from the factory of the portable device, since the resonance frequency f0 of the loop antenna changes as a result of the IO port output being switched to high, by measuring this frequency, it is possible to check mounting defects, and the like of parts peripheral to the FET 1 and the FET 2. After check, by setting the IO port output to low, basically, after the shipment from factory, a low state is reached at all times, and the electrical operation is the same as that in the first embodiment.

In FIG. 10, the IO port of the RFID circuit block 240 is used. Alternatively, an IO port of another circuit block (IC) can be used.

Next, a second embodiment will be described.

The AC waveform that appears inside the gate terminal of the FET takes the form that the AC components that appear in the drain terminal thereof are divided by Cdg and Cgs. If the DC potential of the drain decreases from 3 V to 1 V, for example, whereas Cdg of the FET changes from 4.5 pF to 8 pF, Cgs (=Ciss−Cdg) changes from 4.8 pF to 4 pF. As a result, the voltage division ratio of Cdg to Cgs changes in the direction in which the AC waveform that is transmitted inside the gate terminal increases more. For this reason, the decrease in the drain potential becomes an operation of causing a further decrease in the drain potential. As a result, the drain potential is not stabilized at 1 V, and varies in a switched manner up to around 0 V. That is, the change in the drain potential with respect to the change in the magnitude of the AC waveform becomes an operation having hysteresis property.

Figure 11:
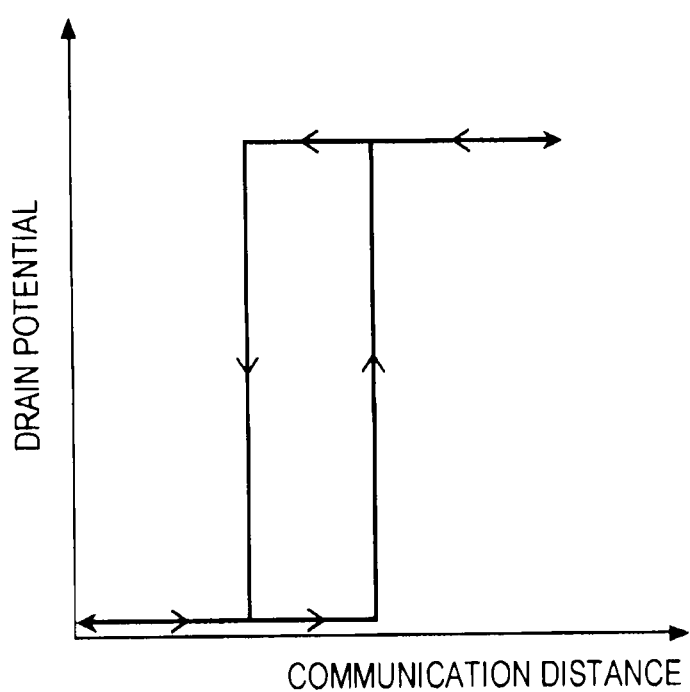
FIG. 11 is a graph illustrating the relationship between the communication distance and the drain potential of the FET.

FIG. 11 illustrates the relationship between the communication distance and the drain potential of the FET. The locus of the change in the drain potential, which is caused by the change of the communication distance, takes a different path for the outgoing path and the return path. That is, the resonance frequency characteristics exhibit hysteresis property. In the manner described above, the drain potential contributes to the parasitic capacitance, and the parasitic capacitance contributes to the resonance frequency in the end. Therefore, if the hysteresis property is insufficient, instability of the parasitic capacitance and eventually the resonance frequency is generated at the time of the change in the drain potential, and the communication characteristics may be affected.

Figure 12:
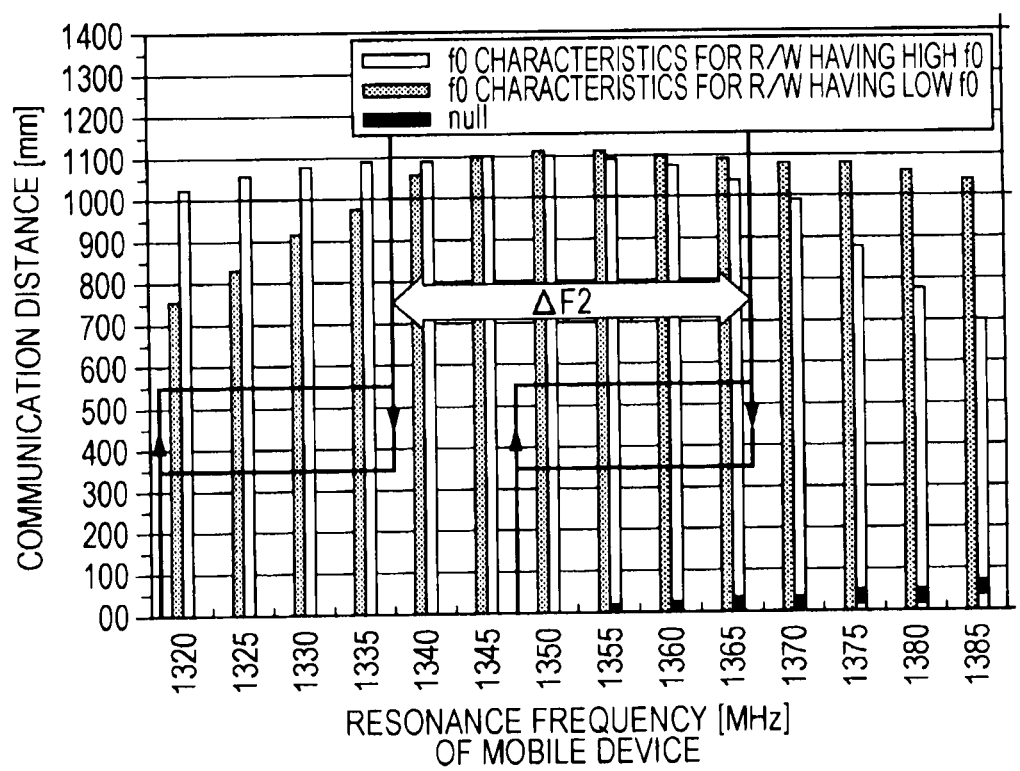
FIG. 12 illustrates effects of hysteresis in the same graph as that of FIG. 6(b).

FIG. 12 illustrates effects of hysteresis in the same graph as that of FIG. 6(b). Here, hysteresis property is illustrated in terms of the relationship between the resonance frequency of the portable device and the communication distance thereof. That is, the communication distance at which the shift of the resonance frequency occurs differs between the departure path and the return path of the change in the communication distance.

The AC waveform amplitude that appears in the drain terminal is such that the waveform that appears in the antenna terminal (a) is divided by the combined capacitance (hereinafter referred to as Cfet) of Cds, Cdg, Cgs, and C1. When this fact is considered, whereas the capacitance value of the C1 scarcely changes at the time of the decrease of the drain potential, Cfet increases. For this reason, the voltage division ratio changes in the direction in which the AC waveform amplitude that is applied to the drain terminal decreases. Conversely, this phenomenon becomes a working of weakening hysteresis property. Therefore, usually, the working of enhancing hysteresis property described above, and the working of weakening hysteresis act at the same time.

In the RFID module shown in FIG. 7, also, hysteresis property can be expected. From the viewpoint of stability of operation, it is preferable that hysteresis property can be enhanced further. When it is desired to enhance hysteresis property, the adjustment is possible by reducing the effect of weakening hysteresis.

Figure 13:
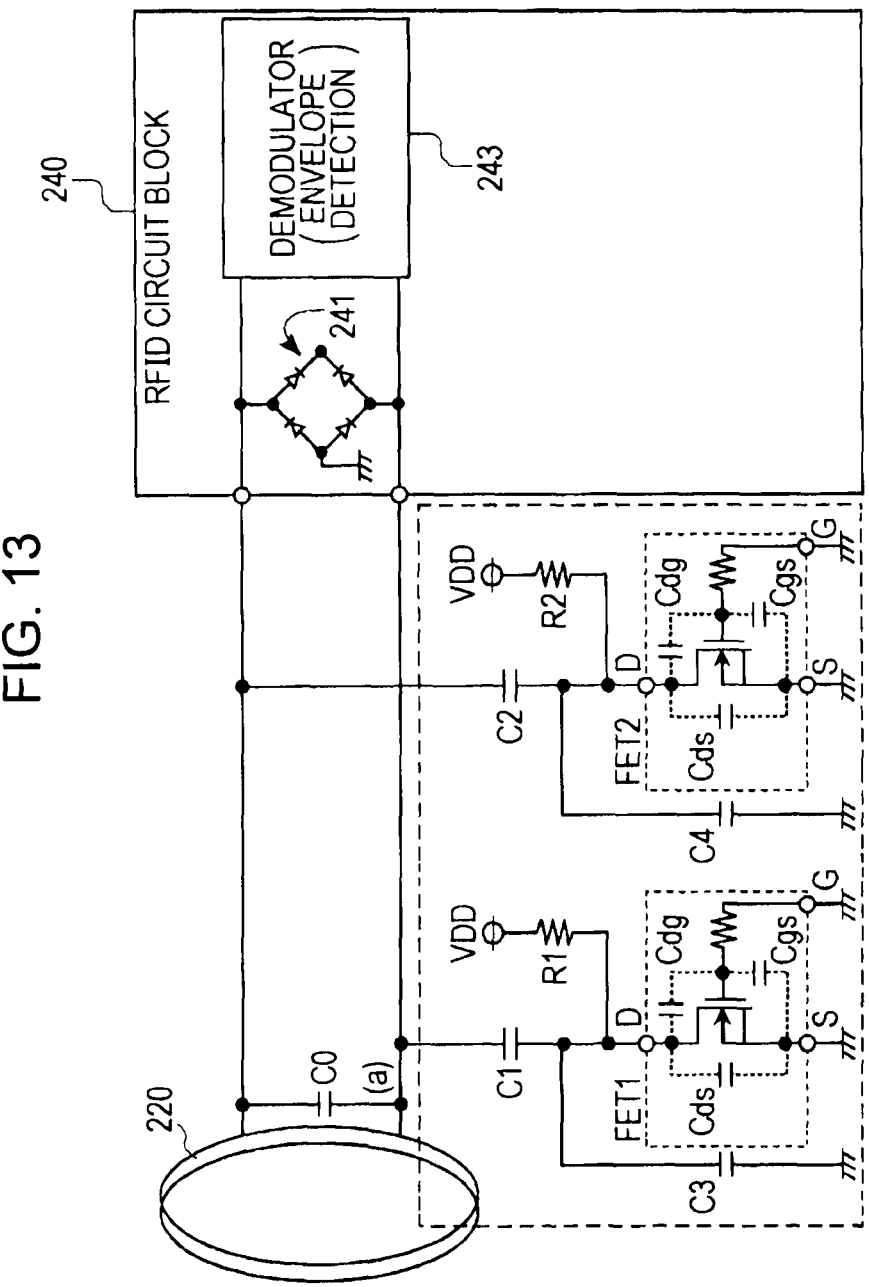
FIG. 13 illustrates an example of the configuration of an RFID module for which hysteresis property can be enhanced.

FIG. 13 illustrates an example of the configuration of an RFID module that is capable of enhancing such hysteresis property. In this figure, components, which are the same as components shown in FIG. 7, are designated with the same reference numerals, and repeated description thereof is omitted.

Differences from the configuration shown in FIG. 7 are the following. That is, a capacitor C3 having its one end connected to the connection point of the DC-cut capacitor C1 and the FET 1 inside a first resonance frequency adjustment circuit 231a of a resonance frequency adjustment unit 230a, and having the other end grounded is provided. Similarly, also, in a second resonance frequency adjustment circuit 232a, a capacitor C4 having its one end connected to the connection point of a DC-cut capacitor C2 and the FET 2 thereof and having the other end grounded is provided.

In the manner described above, whereas the working of enhancing hysteresis depends on the voltage division ratio of Cdg to Cgs, the working of weakening hysteresis depends on the voltage division ratio of C1 to Cfet. Accordingly, when the capacitor C3 is added, the AC waveform amplitude that is applied to the drain terminal D of the FET 1 becomes such that the waveform that appears in the antenna terminal (a) is divided by C1 and (Cfet+C3). For this reason, an influence on the voltage division ratio when the value of Cfet changes is small. As a result, the decrease of the AC amplitude that appears in the drain terminal D when Cfet increases is suppressed, and the "effect of enhancing hysteresis" by the voltage division ratio of Cdg to Cgs becomes dominant. As a result, the hysteresis property tends to be enhanced as a whole.

The above-described modification of the first embodiment can be applied to the second embodiment.

Next, a third embodiment will be described.

Figure 14:
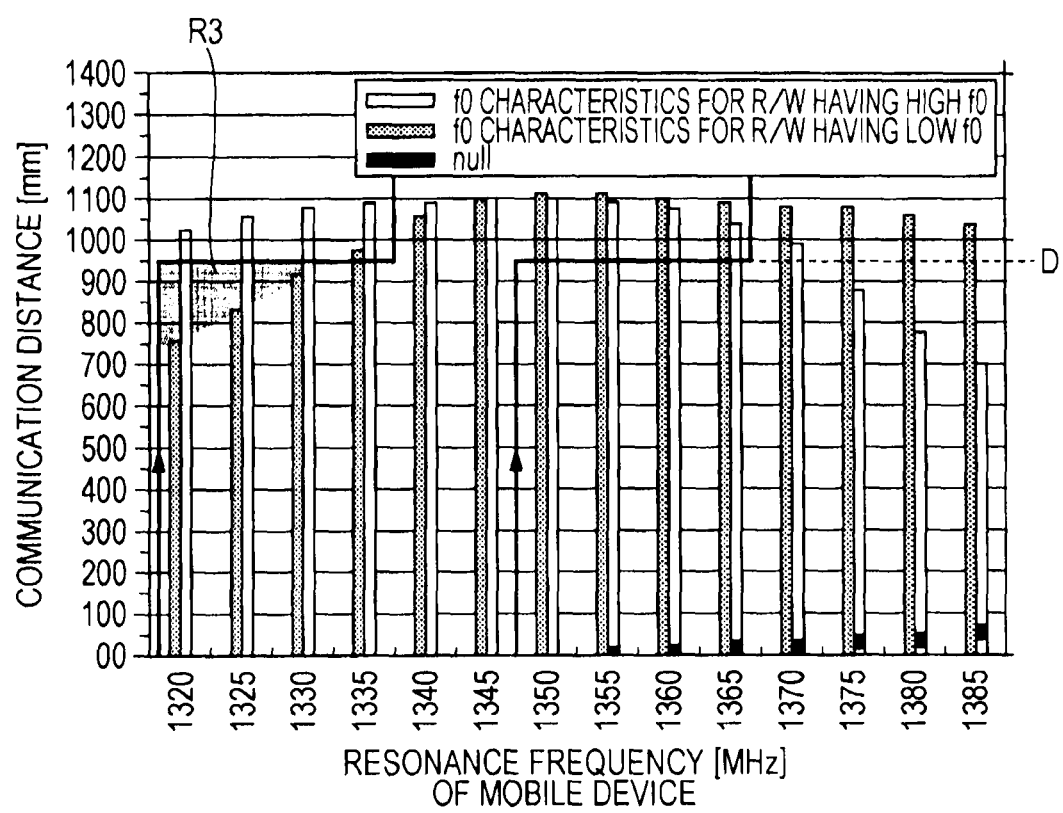
FIG. 14 illustrates a case in which a threshold distance D at which a resonance frequency f0 occurs is far from an R/W.

As shown in FIG. 14, when the threshold distance D of the communication distance at which the above-mentioned shift of the resonance frequency f0 occurs is too far from the R/W, there is a probability that the threshold distance D deviates from the communicable f0 range by the shift of the resonance frequency f0 as in an area R3. For this reason, it is preferable that the threshold distance D (eventually the threshold value of the drain potential decrease) is adjusted so that the resonance frequency f0 changes after the portable device sufficiently comes close to the R/W.

In the resonance frequency adjustment unit 230 of the first embodiment shown in FIG. 7, in order to make the threshold value of the drain potential decrease approach near that of the R/W, it is sufficient that the capacitance values of C1 and C2 are decreased, and the AC waveform amplitude that is transmitted to the drain terminal is decreased. However, when the capacitance values of C1 and C2 are decreased, the shift amount of the resonance frequency f0 at the time of a drain potential decrease is decreased. Consequently, the avoidance performance of null that occurs in the vicinity of the close contact of the R/W is also decreased.

Accordingly, in the third embodiment, a technique for adjusting the threshold value to the vicinity of that of the R/W while securing a sufficient f0 shift amount will be described.

Figure 15:
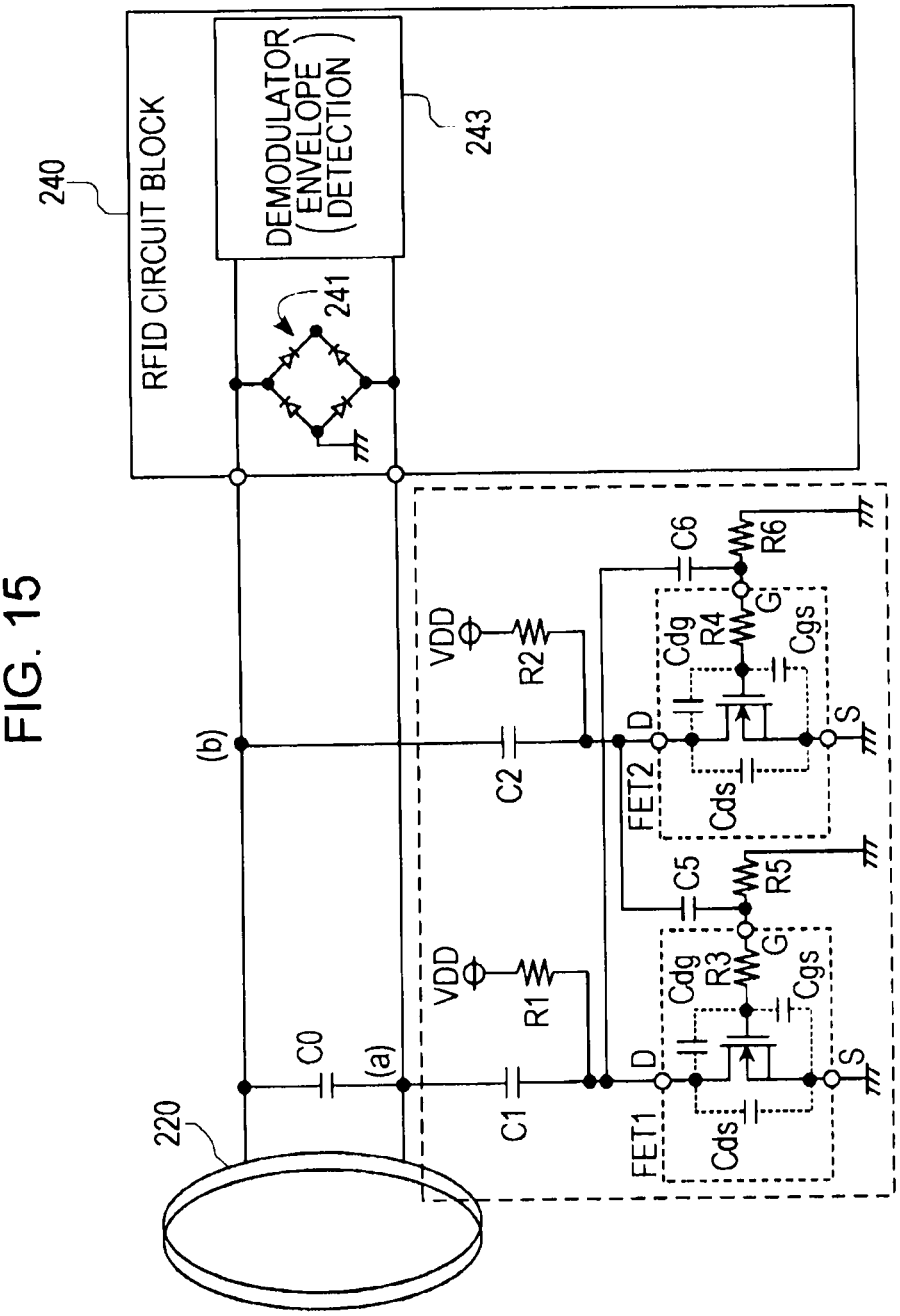
FIG. 15 illustrates an example of the configuration of an RFID module according to a third embodiment.

FIG. 15 illustrates an example of the configuration of an RFID module according to a third embodiment. In this figure, components, which are the same as components shown in FIG. 7, are designated with the same reference numerals, and repeated description thereof is omitted.

In the present embodiment, the fact that the waveforms that appear in the terminal (a) and the terminal (b) at both ends of the loop antenna 220 are mutually in opposite phase as the property of a loop antenna is used.

For this reason, the differences from the configuration shown in FIG. 7 are that resistors R5 and R6, and capacitors C5 and C6 as passive elements for adjusting threshold values are added. As a result, a waveform is drawn from the drain terminal of the FET 2 to the gate terminal of the FET 1 through a capacitor C5, and a waveform is drawn from the drain terminal of the FET 1 to the gate terminal of the FET 2 through a capacitor C6. As a result, an opposite phase waveform from one of the resonance frequency adjustment circuits in the resonance frequency adjustment unit is combined with the waveform that is transmitted through Cdg from the other resonance frequency adjustment circuit.

More specifically, the gate resistor in the first resonance frequency adjustment circuit 231b in the resonance frequency adjustment unit 230b is such that a resistor R3 and a resistor R5 are connected in series with each other. Furthermore, the gate resistor in the second resonance frequency adjustment circuit 232b in the resonance frequency adjustment unit 230b is such that a resistor R4 and a resistor R6 are connected in series with each other.

In addition, the capacitor C5 serving as a first passive element is connected between the connection point of the resistor R3 and the resistor R5 in the resonance frequency adjustment circuit 231b, and the drain terminal D of the FET 2 in the other resonance frequency adjustment circuit 232b. Similarly, a capacitor C6 serving as a second passive element is connected between the connection point of the resistor R4 and the resistor R6 in the resonance frequency adjustment circuit 232b, and the drain terminal D of the FET 1 in the other resonance frequency adjustment circuit 231b.

In order to take a large shift amount of the resonance frequency f0, it is necessary to increase the capacitance values of the capacitors C1 and C2. However, the AC components that are propagated to the inside of the gate after passing through the capacitance Cdg from the drain terminal D are increased, and an f0 shift is caused to occur at a far place from the R/W. For this reason, the capacitors C5 and C6 are arranged for the purpose that a waveform having a phase opposite to the AC components is applied from the gate terminal side so as to be cancelled with each other inside the gate. R5 and R6 are resistors for conveying the waveform AC waveform to the inside of the gate while maintaining the DC potential of the gate terminal at the GND level.

As measures for the constants, C5 and C6 are at approximately the same degree as or lower than Cdg, and R5 and are R6 approximately 10 kΩ to 100 kΩ.

In a case where a resistor is contained in the gate terminal, a phase difference occurs at the time of passing through the resistor, and the cancellation effect is decreased. Thus, it is preferable that the resistance value is equal to or lower than the absolute value of the impedance of Cdg.

Also, in the third embodiment, the features of the modification of the first embodiment, and the second embodiment can be used jointly.

Figure 16:
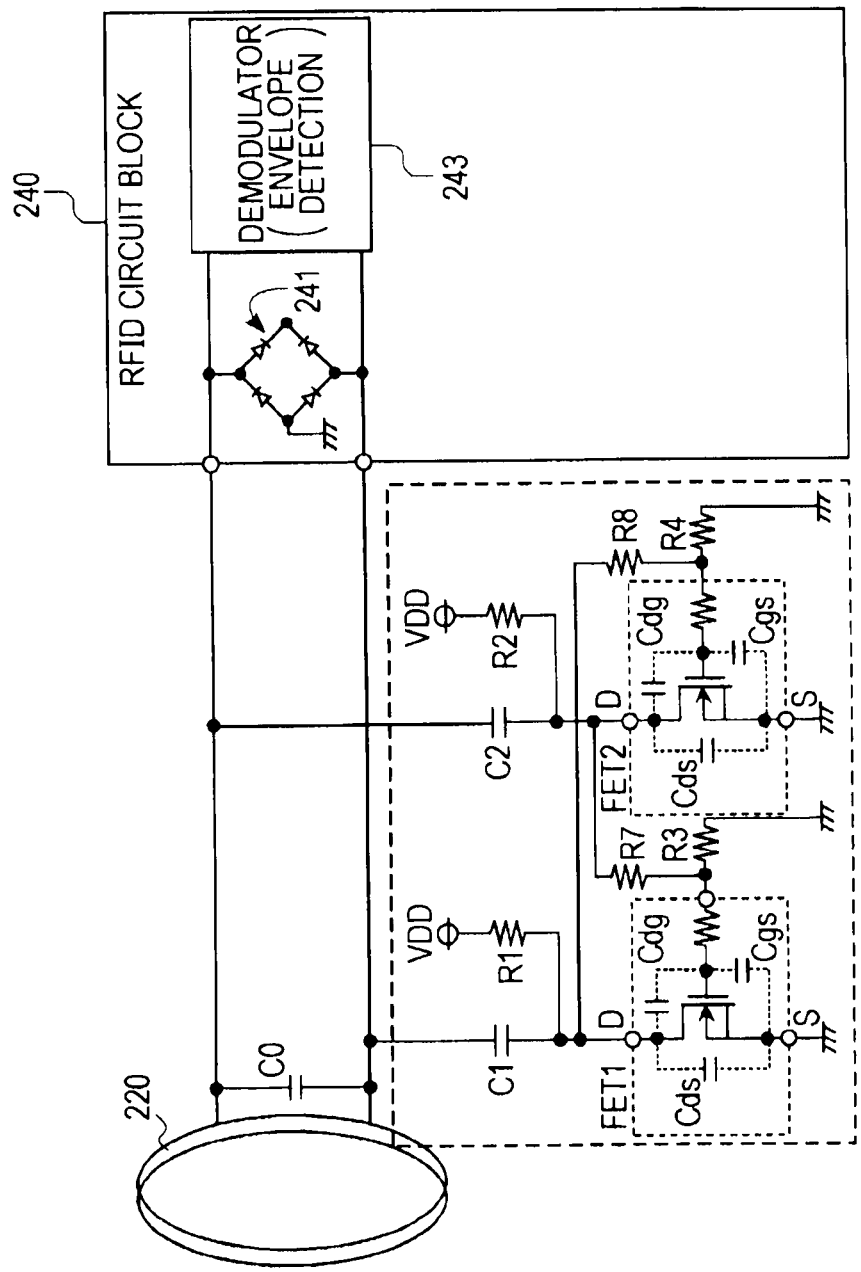
FIG. 16 illustrates a modification of the third embodiment.

FIG. 16 illustrates a modification of the third embodiment. In this figure, components, which are the same as components shown in FIG. 15, are designated with the same reference numerals, and repeated description thereof is omitted. The differences from the configuration shown in FIG. 15 are that resistors R7 and R8 are used in place of the capacitors C5 and C6 as passive elements.

As passive elements, capacitors, resistors, inductors, or any combinations of these can be used. In this case, Q of the antenna may be decreased. If the decrease is within an allowable range, the advantages of the present embodiment can be enjoyed without problems.

The advantages of the above-described first embodiment, which is a typical embodiment, will be described. According to the first embodiment, special advantages such as the following are obtained.

Figure 17:
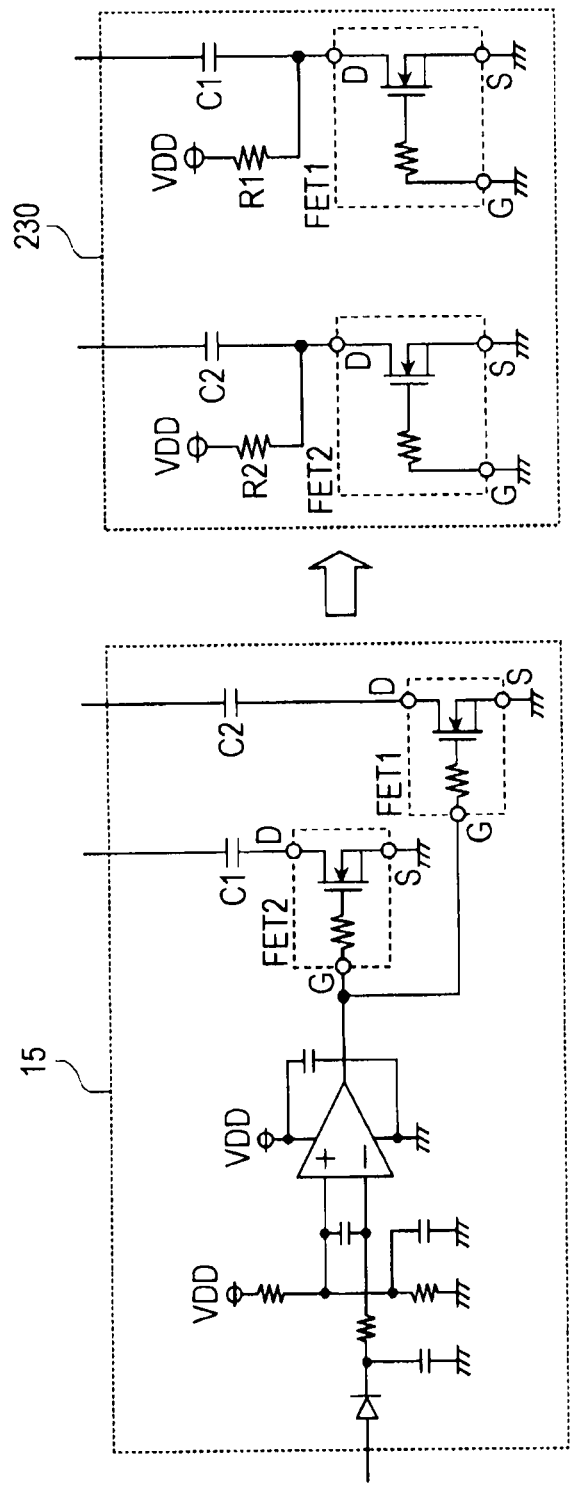
FIG. 17 is an illustration for comparing the circuit scale of the related art that performs switching between capacitance values on the basis of a detection output by using a level detection unit with the circuit scale of the first embodiment.

The first advantage is the effect of the reduction in the number of parts. FIG. 17 is an illustration for comparing circuit scales in the related art that performs switching of capacitance values on the basis of a detection output by using a level detection unit, and in the first embodiment. In the present embodiment, with only a capacitor, an FET, and a pull-up resistor, the detection of the level of the induced voltage of the antenna up to the switching of the capacitance values are performed. For this reason, it is possible to reduce rectification diodes and comparator peripheral circuits, which are necessary for a level detection unit of the related art. In particular, a comparator peripheral circuit in the related art requires many parts, such as a resistor for setting a threshold value, a capacitor for stabilizing electrical potential, a feedback resistor for providing hysteresis, and a protection resistor for when a large input voltage is input from an antenna in a non-powered on state. In the present embodiment, since these parts are unnecessary, the reduction effect is large.

Secondly, a rectification circuit for performing level detection depending on the magnitude of the amplitude of the AC components of the induced voltage of the antenna is not necessary, and in a case where other transmission waves for wireless communication, such as GSM, are superposed on the antenna for RFID, the concern that spurious components occur in the diode 152 of the rectification unit 151 is decreased.

Thirdly, since no comparator is used, standby current of a comparator, and electrical current that is consumed in resistance divided voltage for setting a threshold value can be reduced.

These advantages are basically obtained in common with respect to the above-described embodiments and modifications.

The above-mentioned RFID module is not only embodied in the form of a non-contact IC card, but also can be incorporated into a portable device and used.

Figure 18:
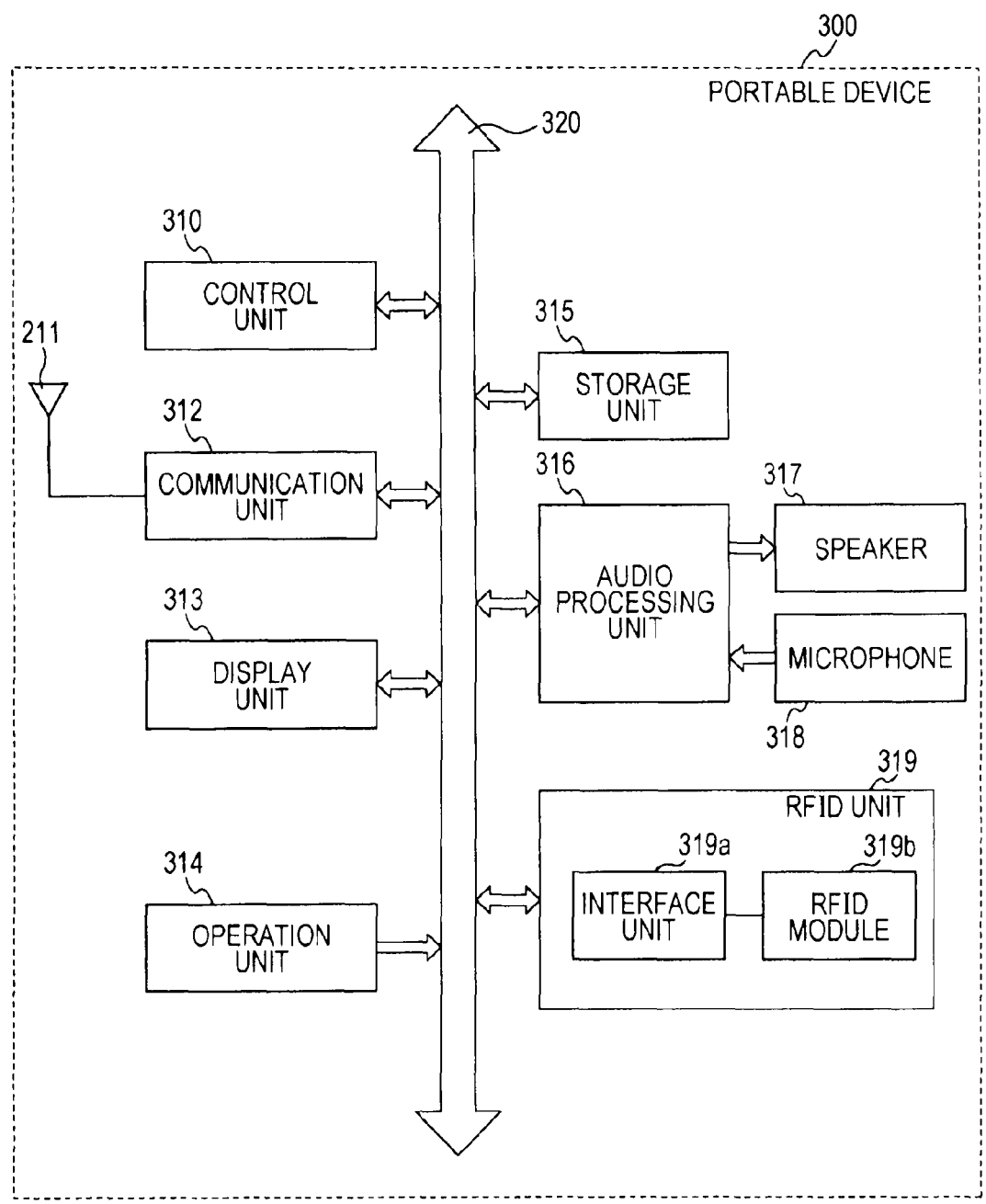
FIG. 18 illustrates an example of the configuration of a portable device having an RFID module incorporated therein according to one of the embodiments.
Figure 19:
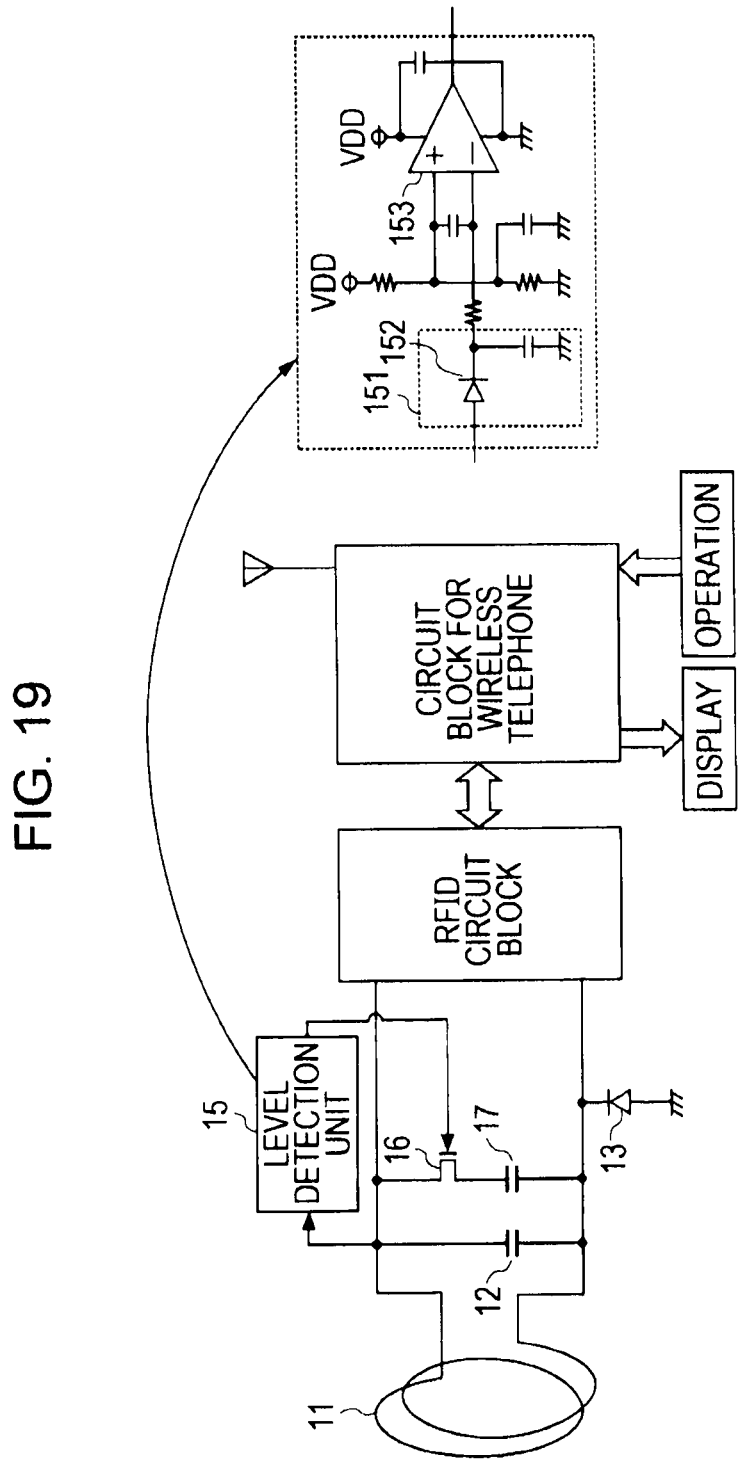
FIG. 19 illustrates the overall configuration of a portable device according to the related art.

FIG. 18 illustrates an example of the configuration of a portable device 300 having an RFID module incorporated therein according to one of the embodiments.

A portable device 300 includes a control unit 310, an antenna 311, a communication unit 312, a display unit 313, an operation unit 314, a storage unit 315, an audio processing unit 316, a speaker 317, a microphone 318, and an RFID unit 319 including an RFID module. The control unit 310 is a processor that performs control of each unit and necessary data processing, the processor being connected to each unit through a bus 320, and has a processor, such as an MPU. The communication unit 312 is a part for performing wireless communication using radio waves with a base station through an antenna. The display unit 313 is a part for providing a display interface to a user, and includes a display device, such as an LCD or an organic EL, for displaying information on the display screen. The operation unit 314 is a part for providing an input interface to the user, and includes input devices, such as a ten-key pad and various control keys. The storage unit 315 is a part for storing the OS and various application programs such as a communication application program, as programs to be executed by the control unit 310, and necessary data, and includes memories, such as a ROM and a RAM. The audio processing unit 316 is a processing unit for received telephone conversation voice, audio of moving image files, and music data, and includes a codec, to which a speaker 317 for outputting voice and a microphone 318 for collecting transmitted telephone conversation voice are connected.

The RFID unit 319 preferably includes an interface unit 319a for interfacing between an RFID module 319b and the control unit 310. The control unit 310 performs control, such as activation/nonactivation of the RFID module 319b, or the like, and can give and receive data to and from the RFID module 319b through the interface unit 319a in an activated state. The RFID module 319b usually has a built-in memory (not shown) for storing data.

The portable device 300 can include, in addition to a mobile phone terminal, a PDA, a game machine, a PC, and a home electrical appliance.

The present specification further provides, as another embodiment, a communication method, in particular, a communication method for an RFID module. This communication method includes the following steps of:

connecting a source grounded FET to one end of an antenna element of an RFID antenna through a capacitor, pulling up a drain terminal of the FET to a predetermined power-supply voltage, grounding the gate terminal of the FET through a resistor, decreasing a DC level of a drain terminal through the capacitor when an AC waveform of a predetermined amplitude or more is input on the basis of a voltage excited in the RFID antenna when an RFID module comes close to an R/W device, and shifting a resonance frequency of a loop antenna toward lower frequencies by increasing a drain-source parasitic capacitance value on the basis of the decrease of the DC level.

In the foregoing, the preferred embodiments have been described. In addition to those described above, various modifications and changes can be made. It should be understood, of course, by those skilled in the art that various modifications, combinations, and other embodiments may be made according to the design or other elements insofar as they come within the scope of the claims, or the equivalence thereof.

For example, a portable device including an RF module has been described. Alternatively, the present embodiments can be applied to an RF module in a card form or in any other forms. Furthermore, specific numerical values given in the embodiments are shown as an example for illustration only, and the claimed invention is not limited to those numerical values.

In the above-described embodiment, a description has been given of an RFID module including an antenna element forming an RFID antenna, an RFID circuit block to which the antenna element is connected, and a resonance frequency adjustment circuit that adjusts a resonance frequency of the RFID antenna, the resonance frequency adjustment circuit being connected to the antenna element, wherein the resonance frequency adjustment circuit includes a capacitor having its one end connected to one end of the antenna element, an FET having its drain terminal connected to the other end of the capacitor and having its source terminal grounded, and a pull-up resistor that is connected between the drain terminal of the FET and a power supply, wherein the gate terminal of the FET is grounded through a resistor.

Furthermore, a description has been given of a RFID module, in which the resonance frequency adjustment circuit further includes another capacitor having its one end connected to a connection point of the above-mentioned capacitor and the FET and having the other end grounded.

Furthermore, a description has been given of a RFID module, including first and second resonance frequency adjustment circuits that are provided in one end and the other end of the antenna element, respectively.

Furthermore, a description has been given of the RFID module, wherein a resistor that is connected to the gate terminal of each FET inside the first and second resonance frequency adjustment circuits includes a first and second resistor that are connected in series with each other, and wherein the RFID module further comprises a first passive element that is connected between the connection point of the first and second resistors in the first resonance frequency adjustment circuit and the drain terminal of the FET in the second resonance frequency adjustment circuit; and a second passive element that is connected between the connection point of the first and second resistors in the second resonance frequency adjustment circuit, and the drain terminal of the FET in the first resonance frequency adjustment circuit.

Furthermore, a description has been given of a RFID module, wherein the gate terminal of the FET is connected to an IO port of the RFID circuit block through the resistor, and the IO port switches its outputs between high and low and is set.

Furthermore, a description has been given of a portable device including a display unit that provides a display interface to a user, an operation unit that provides an input interface to the user, an RFID unit, and a control unit that performs control of each unit and necessary data processing, wherein the RFID unit includes an antenna element forming an RFID antenna, an RFID circuit block to which the antenna element is connected, and a resonance frequency adjustment circuit that adjusts the resonance frequency of the RFID antenna, the resonance frequency adjustment circuit being connected to the antenna element, wherein the resonance frequency adjustment circuit includes a capacitor having its one end connected to one end of the antenna element, an FET having its drain terminal connected to the other end of the capacitor and having its source terminal grounded, and a pull-up resistor that is connected between the drain terminal of the FET and a power supply, and wherein the gate terminal of the FET is grounded through a resistor.

REFERENCE SIGNS LIST

151 . . . rectification unit, 152 . . . diode, 152 . . . rectification diode, 153 . . . comparator, 220 . . . loop antenna, 230, 230a, 230b . . . resonance frequency adjustment unit, 231, 231a, 231b . . . resonance frequency adjustment circuit, 232, 232a, 232b . . . resonance frequency adjustment circuit, 240 . . . RFID circuit block, 241 . . . rectification unit, 243 . . . demodulation unit, 300 . . . portable device, 310 . . . control unit, 311 . . . antenna, 312 . . . communication unit, 313 . . . display unit, 314 . . . operation unit, 315 . . . storage unit, 316 . . . audio processing unit, 317 . . . speaker, 318 . . . microphone, 319 . . . RFID unit, 319a . . . interface (I/F) unit, 319b . . . RFID module, 320 . . . bus

What is claimed is:

1. An RFID module comprising:
an antenna element forming an RFID antenna;
an RFID circuit block to which the antenna element is connected; and
a first resonance frequency adjustment circuit having an element that includes a drain terminal connected to the antenna element, a gate terminal that is grounded, a source terminal that is grounded, wherein a pull-up resistor is connected between the drain terminal and a power supply such that the drain terminal has separate connections to the antenna element and to the power supply,
wherein a DC level of the drain terminal is configured to be decreased through a capacitance between the drain terminal and the gate terminal when an AC waveform of a predetermined amplitude or more is input on the basis of a voltage excited in the RFID antenna when the RFID module comes close to an R/W device, and
the first resonance frequency adjustment circuit is configured to shift a resonance frequency of a loop antenna toward lower frequencies by increasing a drain-source parasitic capacitance value on the basis of the decrease of the DC level of the drain terminal.

2. The RFID module according to claim 1, wherein the antenna element has a first end and a second end, the drain terminal of the first resonance frequency adjustment circuit being connected to the first end of the antenna element, the RFID module further comprising:
a second resonance frequency adjustment circuit having an element that includes a drain terminal connected to the second end of the antenna element, a gate terminal that is grounded, and a source terminal that is grounded, wherein a pull-up resistor is connected between the drain terminal of the second resonance frequency adjustment circuit and a power supply.

3. The RFID module according to claim 2, wherein a capacitor is provided between the first end and the second end of the antenna element.

4. The RFID module according to claim 2, wherein for each of the first resonance frequency adjustment circuit and the second resonance frequency adjustment circuit, the gate terminal is grounded through a pair of resistors connected in series, and a capacitor is provided that has one end connected between the pair of resistors and has another end connected to the drain terminal of the other of the first resonance frequency adjustment circuit and the second resonance frequency adjustment circuit.

5. The RFID module according to claim 1, wherein the gate terminal is grounded through a resistor.

6. The RFID module according to claim 1, wherein the gate terminal is connected to an input/output (IO) port of the RFID circuit block.

7. The RFID module according to claim 1, wherein the antenna element forms a loop antenna.

8. The RFID module according to claim 1, wherein the element of the first resonance frequency adjustment circuit is a field effect transistor (FET).

9. The RFID module according to claim 1, wherein the first resonance frequency adjustment circuit further includes a first capacitor having a first end connected to the antenna element and a second end connected to the drain terminal.

10. The RFID module according to claim 9, wherein the second end of the first capacitor further connects to a first end of a second capacitor, and a second end of the second capacitor is grounded.

11. A near field communication (NFC) system comprising the RFID module according to claim 1.

12. A portable device comprising:
a display unit that provides a display interface to a user;
an operation unit that provides an input interface to the user;
an RFID unit; and
a control unit that performs control of each unit and data processing,
wherein the RFID unit includes:
an antenna element forming an RFID antenna;
an RFID circuit block to which the antenna element is connected; and
a resonance frequency adjustment circuit having an element that includes a drain terminal connected to the antenna element, a gate terminal that is grounded, and a source terminal that is grounded, wherein a pull-up resistor is connected between the drain terminal and a power supply, such that the drain terminal has separate connections to the antenna element and to the power supply,
wherein a DC level of the drain terminal is configured to be decreased through a capacitance between the drain terminal and the gate terminal when an AC waveform of a predetermined amplitude or more is input on the basis of a voltage excited in the RFID antenna when the RFID unit comes close to an R/W device, and
the first resonance frequency adjustment circuit is configured to shift a resonance frequency of a loop antenna toward lower frequencies by increasing a drain-source parasitic capacitance value on the basis of the decrease of the DC level of the drain terminal.

13. A communication method for an RFID module having an antenna element forming an RFID antenna, an RFID circuit block to which the antenna element is connected, and a resonance frequency adjustment circuit, the method comprising:
connecting a source grounded element of the resonance frequency adjustment circuit to one end of the antenna element;
pulling up a drain terminal of the source grounded element to a power-supply voltage through a pull-up resistor;
grounding the gate terminal of the source grounded element;
decreasing a DC level of the drain terminal of the source grounded element through a capacitance between the drain terminal and the gate terminal when an AC waveform of a predetermined amplitude or more is input on the basis of a voltage excited in the RFID antenna when the RFID module comes close to an R/W device; and
shifting a resonance frequency of a loop antenna toward lower frequencies by increasing a drain-source parasitic capacitance value on the basis of the decrease of the DC level.

* * * * *